(12) United States Patent
Clinch et al.

(10) Patent No.: US 7,086,817 B2
(45) Date of Patent: Aug. 8, 2006

(54) COLLAPSIBLE NUT

(75) Inventors: James Patrick Clinch, Sterling Heights, MI (US); Paul Douglas Purdy, Holly, MI (US); William Robert Turnmire, Almont, MI (US)

(73) Assignee: Textron Inc., Providence, RI (US)

( * ) Notice: Subject to any disclaimer, the term of this patent is extended or adjusted under 35 U.S.C. 154(b) by 166 days.

(21) Appl. No.: 10/341,575

(22) Filed: Jan. 13, 2003

(65) Prior Publication Data
US 2004/0136804 A1 Jul. 15, 2004

(51) Int. Cl.
*F16B 39/284* (2006.01)
*F16B 39/28* (2006.01)
(52) U.S. Cl. .................. 411/111; 411/103; 411/113; 411/183; 411/427
(58) Field of Classification Search ............... 411/183, 411/111–113, 85, 181, 103, 427, 84; 29/512
See application file for complete search history.

(56) References Cited

U.S. PATENT DOCUMENTS

| | | | | |
|---|---|---|---|---|
| 1,760,834 A | * | 5/1930 | Carr | 411/112 |
| 2,234,557 A | * | 3/1941 | Hungerford | 411/112 |
| 2,255,650 A | * | 9/1941 | Burke | 411/44 |
| 2,258,342 A | | 10/1941 | Tinnerman | |
| 2,303,148 A | | 11/1942 | Tinnerman | |
| 2,390,752 A | | 12/1945 | Tinnerman | |
| 2,409,209 A | * | 10/1946 | Johnson | 411/111 |
| 2,495,037 A | | 1/1950 | Tinnerman | |
| 2,567,864 A | * | 9/1951 | Becker | 411/112 |
| 2,649,883 A | | 8/1953 | Sharp | |
| 2,695,046 A | | 11/1954 | Tinnerman, III | |
| 2,716,434 A | | 8/1955 | Crowther | |
| 2,861,618 A | | 11/1958 | Tinnerman | |
| 2,867,258 A | | 1/1959 | Flora et al. | |
| 2,867,259 A | | 1/1959 | Barron | |
| 2,875,805 A | | 3/1959 | Flora | |
| 3,004,638 A | | 10/1961 | Eaton | |
| 3,025,897 A | | 3/1962 | Gieleghem | |
| 3,123,120 A | | 3/1964 | Grimm et al. | |
| 3,177,916 A | | 4/1965 | Rosan | |

(Continued)

FOREIGN PATENT DOCUMENTS

DE 1055718 4/1959

(Continued)

OTHER PUBLICATIONS

Textron, "2000 Annual Report", published prior to Apr. 25, 2001 per p. 64 of thereport, cover sheet and p. 12 only.*

*Primary Examiner*—Katherine Mitchell
(74) *Attorney, Agent, or Firm*—Trexler, Bushnell, Giangiorgi, Blackstone & Marr, Ltd.

(57) ABSTRACT

A cage nut assembly includes a nut having a cylindrical portion extending from a plate portion. The nut is encaged in a cage such that the cylindrical portion extends through an aperture in the cage. The cylindrical portion of the nut is collapsible such that the nut collapses and provides a plurality of flanges upon an application of force. The flanges are folded or curved/mushroomed such that the plate portion of the nut is suspended within the cage so that the nut will not, or will minimally, stick to the cage or workpiece when coated with e-coat or ELPO. Upon torqueing a fastener into place, the flanges are bent up to allow the plate portion to interface with the cage or a workpiece to provide a solid joint.

44 Claims, 28 Drawing Sheets

U.S. PATENT DOCUMENTS

| | | | |
|---|---|---|---|
| 3,219,790 A | | 11/1965 | Johnson |
| 3,236,143 A | * | 2/1966 | Wing .......................... 411/34 |
| 3,255,798 A | | 6/1966 | Anderson et al. |
| 3,314,465 A | * | 4/1967 | Bien .......................... 411/112 |
| 3,451,455 A | * | 6/1969 | Parkin ........................ 411/108 |
| 3,556,570 A | | 1/1971 | Cosenza |
| 3,670,796 A | | 6/1972 | Grimm |
| 3,695,324 A | | 10/1972 | Gulistan |
| 3,765,078 A | | 10/1973 | Gulistan |
| 3,783,922 A | | 1/1974 | Petrus |
| 3,785,421 A | | 1/1974 | Launay |
| 3,797,358 A | * | 3/1974 | Allender ....................... 411/38 |
| 3,948,142 A | * | 4/1976 | McKay et al. ................. 411/38 |
| 4,015,650 A | | 4/1977 | Anderson |
| 4,036,692 A | | 7/1977 | Walton |
| 4,146,074 A | * | 3/1979 | Kowalski .................... 411/111 |
| 4,170,424 A | | 10/1979 | Boehm |
| 4,186,787 A | | 2/1980 | Hussain |
| 4,193,435 A | | 3/1980 | Charles et al. |
| 4,263,831 A | | 4/1981 | Smith |
| 4,557,650 A | | 12/1985 | Molina |
| 4,732,518 A | | 3/1988 | Toosky |
| 4,741,654 A | | 5/1988 | Lovisek |
| 4,762,451 A | | 8/1988 | Collins |
| 4,790,701 A | | 12/1988 | Baubles |
| 4,793,757 A | | 12/1988 | Peterson |
| 4,830,557 A | * | 5/1989 | Harris et al. ................. 411/113 |
| 4,875,817 A | | 10/1989 | Suzumura et al. |
| 4,900,209 A | * | 2/1990 | Reynolds .................... 411/432 |
| 5,028,189 A | | 7/1991 | Harley |
| 5,066,180 A | | 11/1991 | Lang et al. |
| 5,074,727 A | | 12/1991 | Wentzel |
| 5,096,349 A | | 3/1992 | Landy et al. |
| 5,096,350 A | | 3/1992 | Peterson |
| 5,137,406 A | * | 8/1992 | Cosenza ..................... 411/113 |
| 5,245,743 A | | 9/1993 | Landy et al. |
| 5,380,136 A | * | 1/1995 | Copple et al. ............... 411/183 |
| 5,405,228 A | | 4/1995 | Reid et al. |
| 5,468,104 A | | 11/1995 | Reid et al. |
| 5,533,850 A | | 7/1996 | Ishihara et al. |
| 5,558,369 A | | 9/1996 | Cornea et al. |
| 5,628,598 A | | 5/1997 | Hofle |
| 5,630,686 A | | 5/1997 | Billmann |
| 5,639,113 A | * | 6/1997 | Goss et al. ............... 280/728.2 |
| 5,704,747 A | | 1/1998 | Hutter, III et al. |
| 5,746,561 A | | 5/1998 | Nygren, Jr. et al. |
| 5,797,581 A | | 8/1998 | Sherman |
| 5,893,694 A | | 4/1999 | Wilusz et al. |
| 5,919,016 A | * | 7/1999 | Smith et al. ................... 411/34 |
| 6,077,010 A | | 6/2000 | Reid et al. |
| 6,139,237 A | * | 10/2000 | Nagayama .................. 411/181 |
| 6,146,071 A | | 11/2000 | Norkus et al. |
| 6,183,180 B1 | | 2/2001 | Copple et al. |
| 6,254,325 B1 | * | 7/2001 | Kun ............................. 411/38 |
| 6,499,923 B1 | | 12/2002 | LeVey |
| 6,746,193 B1 | | 6/2004 | Drake |
| 2002/0136617 A1 | | 9/2002 | Imahigashi |
| 2003/0129041 A1 | | 7/2003 | Mitts et al. |
| 2003/0147715 A1 | | 8/2003 | Curley, Jr. et al. |
| 2004/0005205 A1 | | 1/2004 | Yake et al. |

FOREIGN PATENT DOCUMENTS

| | | |
|---|---|---|
| DE | 3445514 | 6/1986 |
| DE | 19533138 C1 * | 11/1996 |
| FR | 2871535 | 6/2004 |
| GB | 687110 | 2/1953 |
| JP | 8114213 | 5/1996 |
| WO | WO 03/042557 A1 * | 5/2003 |

* cited by examiner

COLLAPSIBLE NUT

BACKGROUND OF THE INVENTION

The present invention relates to a cage nut assembly, a nut used in the cage nut assembly, and a method of forming the cage nut assembly.

Cage nut assemblies are well known in the art and provide a useful function in that they are able to hold a threaded nut at locations in a frame that are difficult or in some cases impossible to reach with a tool. Cage nut assemblies are used in vehicles for seat attachments, radiator attachments, chassis to drive train attachments, and for any other nut application that requires the nut to have an "X" and "Y" axis adjustability to accommodate tolerance variations and enable engagement thereof by a male threaded fastener.

Problems have arisen in conjunction with prior art cage nut assemblies. One problem occurs after the cages of the cage nut assemblies are welded to a mating surface, such as an automobile frame. After the cages are welded to the automobile frame, the frames are sent through an e-coat or ELPO bath that adds a corrosion or paint coating thereto. In cage nut assemblies where the underside of the nut is capable of sitting flat on the cage, the nut and cage may stick together when the e-coat or ELPO bath is applied thereto, thus removing the intended float/adjustability of the nut within the cage.

At least two known and separate United States patents have acknowledged this problem and have attempted to provide cage nut assemblies which solve the problem. U.S. Pat. No. 5,096,350 discusses the use of any item attached to either the cage or the nut, or to a third part positioned between the nut and the cage, that flattens out when the nut is torqued into place. This item allows for the stand-off needed during the e-coat and provides for a solid joint when the nut is torqued into place. These flattenable projections either on the cage or the nut, or the addition of a third part with the flattenable projections thereon, provide high manufacturing costs to the cage nut assembly.

U.S. Pat. No. 5,630,686 discusses the use of plastic rings staked at the top of a nut extrusion that hold the nut up off of the cage floor or mating panel, thus removing the possibility that the e-coat will allow the parts to stick together. The plastic rings are flexible enough to allow a solid joint to take place when the nut is lowered to interface with the cage floor or mating panel when the nut is torqued down. This patent requires the plastic rings in order to perform the desired function. The addition of the plastic rings to the cage nut assembly is expensive and the rings sometimes disengage from the assembly when the nut is torqued into place thus causing a buzz, squeak rattle ("BSR") issue with customers.

Thus, there is a need for a cage nut assembly which does not allow the nut to become stuck to the cage during the application of an e-coat or ELPO bath and which overcomes the disadvantages of the aforementioned United States patents which have attempted to solve this same problem.

OBJECTS AND SUMMARY OF THE INVENTION

A primary object of an embodiment of the present invention is to provide a cage nut assembly which reduces the possibility of the nut sticking to the cage when an e-coat or ELPO bath is applied thereto.

Another object of an embodiment of the present invention is to provide a cage nut assembly that has strong joints between the nuts and the cages after the nuts are torqued into place.

Another object of an embodiment of the present invention is to provide a cage nut assembly where the nut is allowed to float within the cage after coating of the mating surface, to which the cage is attached.

Still another object of an embodiment of the present invention is to provide a cage nut assembly which can be economically manufactured.

Another object of an embodiment of the present invention is to provide a cage nut assembly which has a nut that can be collapsed in order to suspend the nut from the cage.

Yet another object of an embodiment of the present invention is to provide a cage nut assembly in which the nut is suspended from the cage prior to the torqueing of a fastener into place, and thereafter, the nut being able to interface with the cage when the fastener is torqued into place to provide a solid joint.

Briefly, and in accordance with the foregoing, an embodiment of the present invention provides a cage nut assembly which includes a cage and a nut. The nut has a cylindrical portion extending from a plate portion. The nut is encaged in the cage such that the cylindrical portion extends through an aperture in the cage. The cylindrical portion of the nut is collapsible such that when a press presses down on the cylindrical portion, the nut collapses and provides a plurality of flanges. The flanges are folded down or curved/mushroomed such that the plate portion of the nut is suspended within the cage such that the nut will not stick to the cage or workpiece when they are coated with e-coat or ELPO. Upon torqueing a fastener into place, the plate portion interfaces with the cage or workpiece to provide a solid joint, with the flanges being bent up to allow for the lowering of the plate portion to the cage or workpiece. A bushing can also be provided on the cage around the cylindrical portion to act as an electro-plating inhibitor such that the nut and the cage do not come into contact with one another.

FIGS. 1–6 illustrate a cage nut assembly which is in accordance with a first embodiment of the present invention where the flanges are folded down and a bushing is not provided. FIGS. 7–12 illustrate a cage nut assembly which is in accordance with a second embodiment of the present invention where the flanges are folded down and a bushing is provided. FIGS. 13–18 illustrate a cage nut assembly which is in accordance with a third embodiment of the present invention where the flanges are curved/mushroomed and a bushing is not provided. FIGS. 19–24 illustrate a cage nut assembly which is in accordance with a fourth embodiment of the present invention where the flanges are curved/mushroomed and a bushing is provided. FIGS. 25–28 illustrate a cage nut assembly which is in accordance with a fifth embodiment of the present invention where the flanges are folded down and a bushing is not provided, and which has a cage which is different in structure than those illustrated in FIGS. 1–24.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENTS

Figure 1:
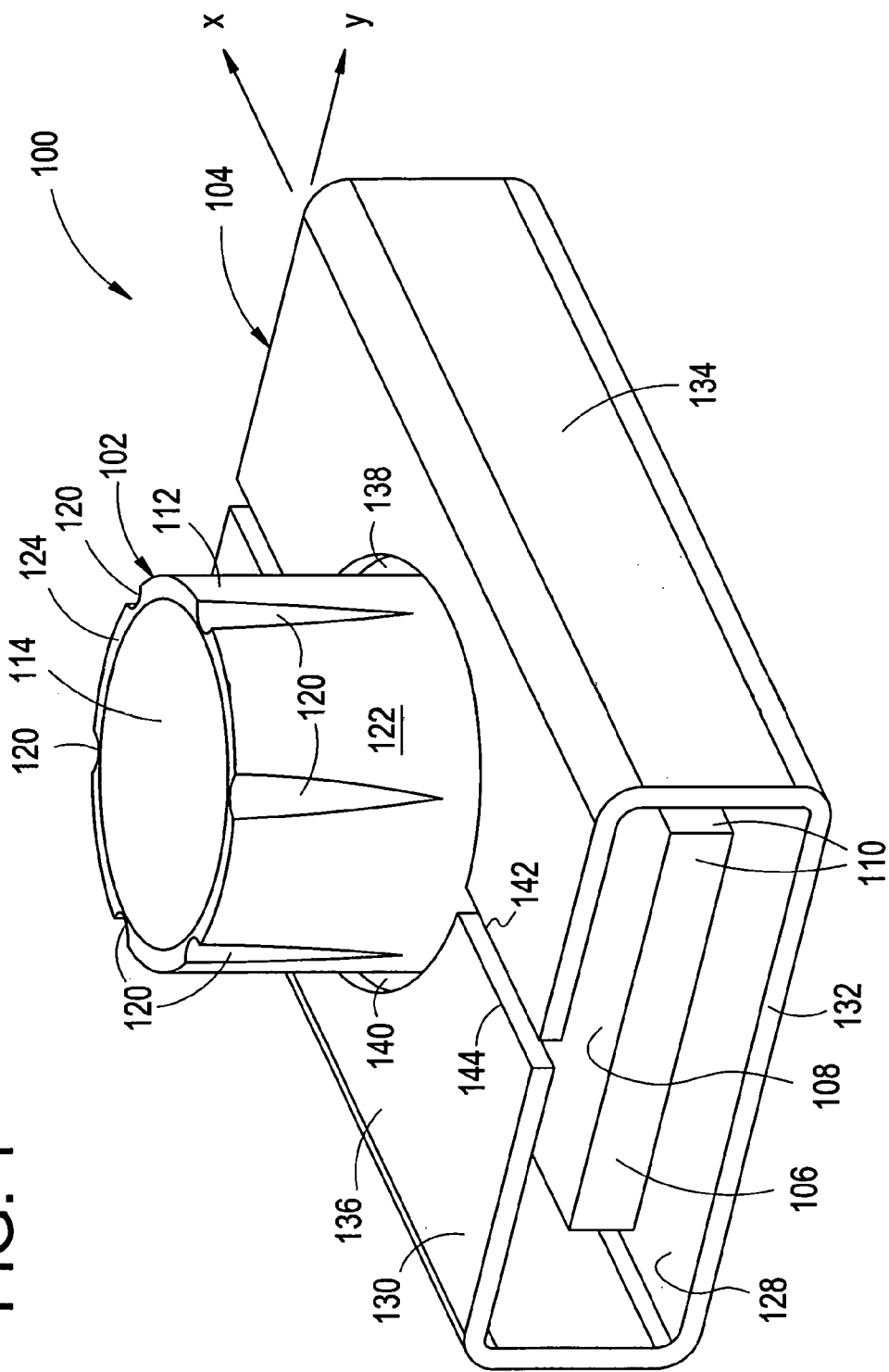
FIG. 1 is a perspective view of a cage nut assembly which is in accordance with a first embodiment of the invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated and described herein.

Several different embodiments of the present invention are shown and described herein. Specifically, a cage nut assembly 100 which is in accordance with a first embodiment of the present invention is shown in FIGS. 1–6. A cage nut assembly 200 which is in accordance with a second embodiment of the present invention is shown in FIGS. 7–12. A cage nut assembly 300 which is in accordance with a third embodiment of the present invention is shown in FIGS. 13–18. A cage nut assembly 400 which is in accordance with a fourth embodiment of the present invention is shown in FIGS. 19–24. A cage nut assembly 500 which is in accordance with a fifth embodiment of the present invention is shown in FIGS. 25–28. Like elements are denoted with like reference numerals with the first embodiment being illustrated and described using reference numerals in the one hundreds, the second embodiment being illustrated and described using reference numerals in the two hundreds, the third embodiment being illustrated and described using reference numerals in the three hundreds, the fourth embodiment being illustrated and described using reference numerals in the four hundreds, and the fifth embodiment being illustrated and described using reference numerals in the five hundreds.

Each one of the cage nut assemblies shown in the FIGURES and described herein provides a cage nut assembly which generally includes a cage and a nut that is capable of collapsing to provide a plurality of flanges which can then be folded down or curved/mushroomed such that a plate portion of the nut is suspended within the cage to prevent the nut from sticking to the cage or a workpiece when they are coated with e-coat or ELPO. Thus, each one of the cage nut assemblies (1) reduces the possibility of the nut sticking to the cage when an e-coat or ELPO bath is applied thereto; (2) has strong joints between the nuts and the cages after the nuts are torqued into place; (3) allows the nut to float within the cage after coating of the mating surface to which the cage is attached; (4) can be economically manufactured; and (5) has a nut that can be collapsed in order to suspend the nut from the cage.

Attention is directed to a cage nut assembly 100 which is in accordance with a first embodiment of the present invention, and which is best illustrated in FIGS. 1–6. The cage nut assembly 100 includes a nut 102 and a cage 104.

Figure 2:
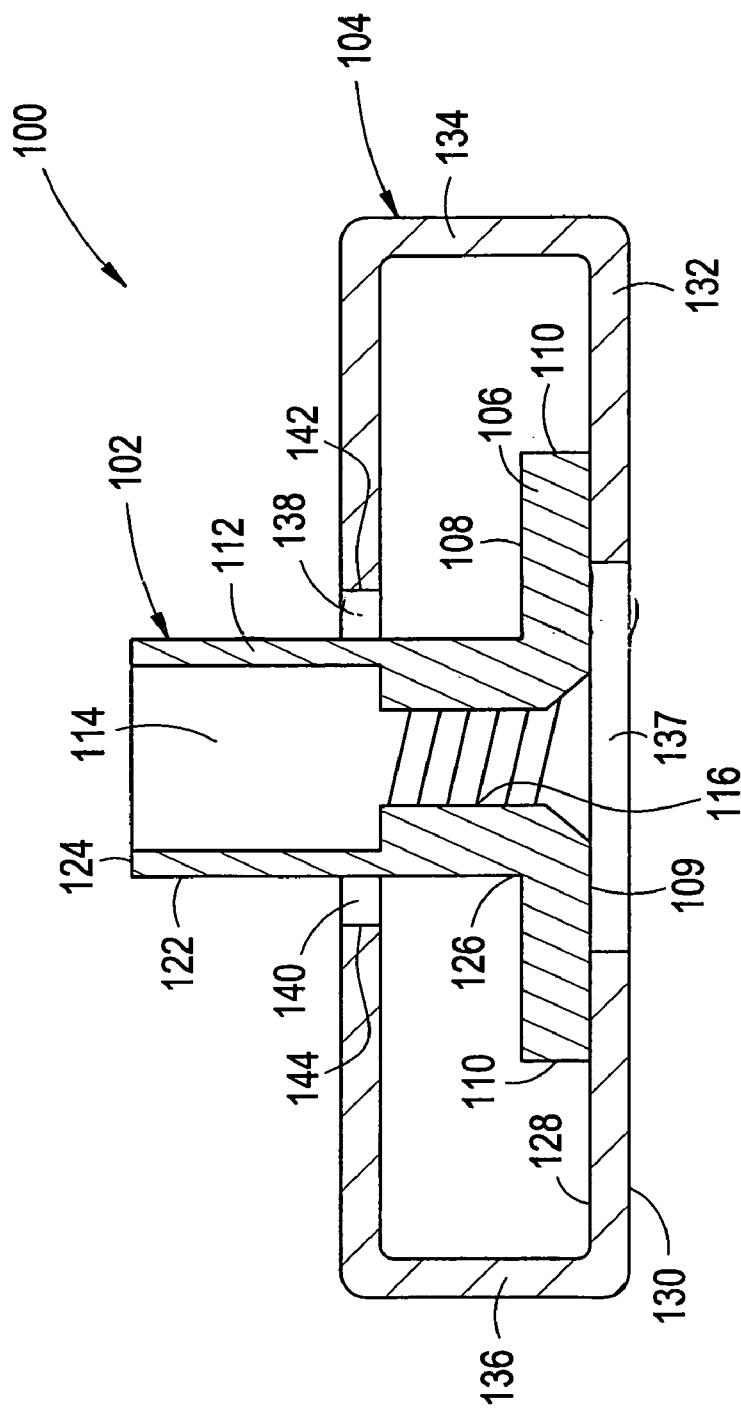
FIG. 2 is a cross-sectional view of the cage nut assembly shown in FIG. 1.

The nut 102 is best illustrated in FIGS. 1 and 2. The nut 102 includes a rectangular plate or base portion 106 having a generally planar upper surface 108, a generally planar lower surface 109, and sidewalls 110 which connect the upper surface 108 to the lower surface 109. The nut 102 also includes a cylindrical member 112 which extends outwardly from the upper surface 108 of the nut 102. The cylindrical member 112 is preferably in the form of a right circular cylinder. An aperture 114 extends through the nut 102 from the plate 106 into the cylindrical member 112. The aperture 114 maybe closed at the lower surface 109 of the plate 106 or it may, preferably, extend all the way through the plate 106. The aperture 114 defines an aperture wall 116 which is preferably threaded and is capable of receiving a fastener 118, such as a bolt or screw, to be attached thereto.

The cylindrical member 112 also preferably includes a plurality of indents 120 provided along an outer surface 122 of the cylindrical member 112. The indents 120 extend from a top end 124 of the cylindrical member 112 generally straight down toward a bottom end 126 of the cylindrical member 112, which is provided at a position where the cylindrical member 112 extends from the upper surface 108 of the plate 106.

The nut 102 may be formed by cold forming, stamping, or staking a nut member into a plate member. The nut 102 may then be heat treated, if desired, depending on the hardness of the material of the nut 102.

The cage 104 is used for encaging the nut 102. Prior to encaging the nut 102, the cage 104 has generally planar upper and lower surfaces 128, 130. The cage 104 includes a base portion 132 and bendable first and second arm portions 134, 136 extending from opposite ends of the base portion 132. The first and second arm portions 134, 136 are preferably integrally formed with the base portion 132.

An aperture 137 is provided through the base portion 132 of the cage 104 and the first and second arm portions 134, 136 have generally semi-circular cutouts 138, 140 at their free ends 142, 144.

In operation, and as best illustrated in FIGS. 1–6, the nut 102 is positioned on the upper surface 128 of the base portion 132 such that the lower surface 109 of the nut 102 is placed flat on the upper surface 128 of the base portion 132.

Each of the arm portions 134, 136 is then bent around one of the sidewalls 112 of the nut 102 and above the upper surface 108 of the nut 102. The free ends 142, 144 of the arm portions 134, 136 are typically spaced apart and the semi-circular cutouts 138, 140 are in alignment with one another. The cylindrical member 112 of the nut 102 extends through the semi-circular cutouts 138, 140. Thus, the cage 104 effectively encages the nut 102 to form the cage nut assembly 100, which is best illustrated in FIGS. 1 and 2. The cage 104 is sized so that the nut 102 has a limited range of movement in at least one dimension, and preferably in two dimensions, for example the "X" and "Y" axes as illustrated in FIG. 1.

Once the cage nut assembly 100 is formed, a first portion (not shown) of a press (not shown) supports the lower surface 109 of the nut 102 off of the upper surface 128 of the base portion 132 of the cage 104, as the first portion of the press is capable of extending through the aperture 137 in the base portion 132 of the cage 104. A second portion (not shown) of the press then lowers onto the top end 124 of the cylindrical member 112 of the nut 102. The press then presses down onto the top end 124 of the cylindrical member 112 which results in the tearing of the cylindrical member 112 along the indents 120.

The tearing of the cylindrical member 112 along the indents 120 causes the nut 102 to collapse and provide a plurality of flanges 146. It should be noted that while the flanges 146 are preferably formed by indents 120 in the cylindrical member 112, the flanges 146 could also be preformed in the cylindrical member 112 such that they are connected by a webbing (not shown) or any other similar or equivalent construction, which would tear upon the press pressing down on the top end 124 of the cylindrical member 112. Alternatively, the flanges 146 could be preformed in the cylindrical member 112 such that they are separated by slits (not shown), which would allow for the flanges 146 to be bent down upon the press pressing down on the top end 124 of the cylindrical member 112.

Figure 3:
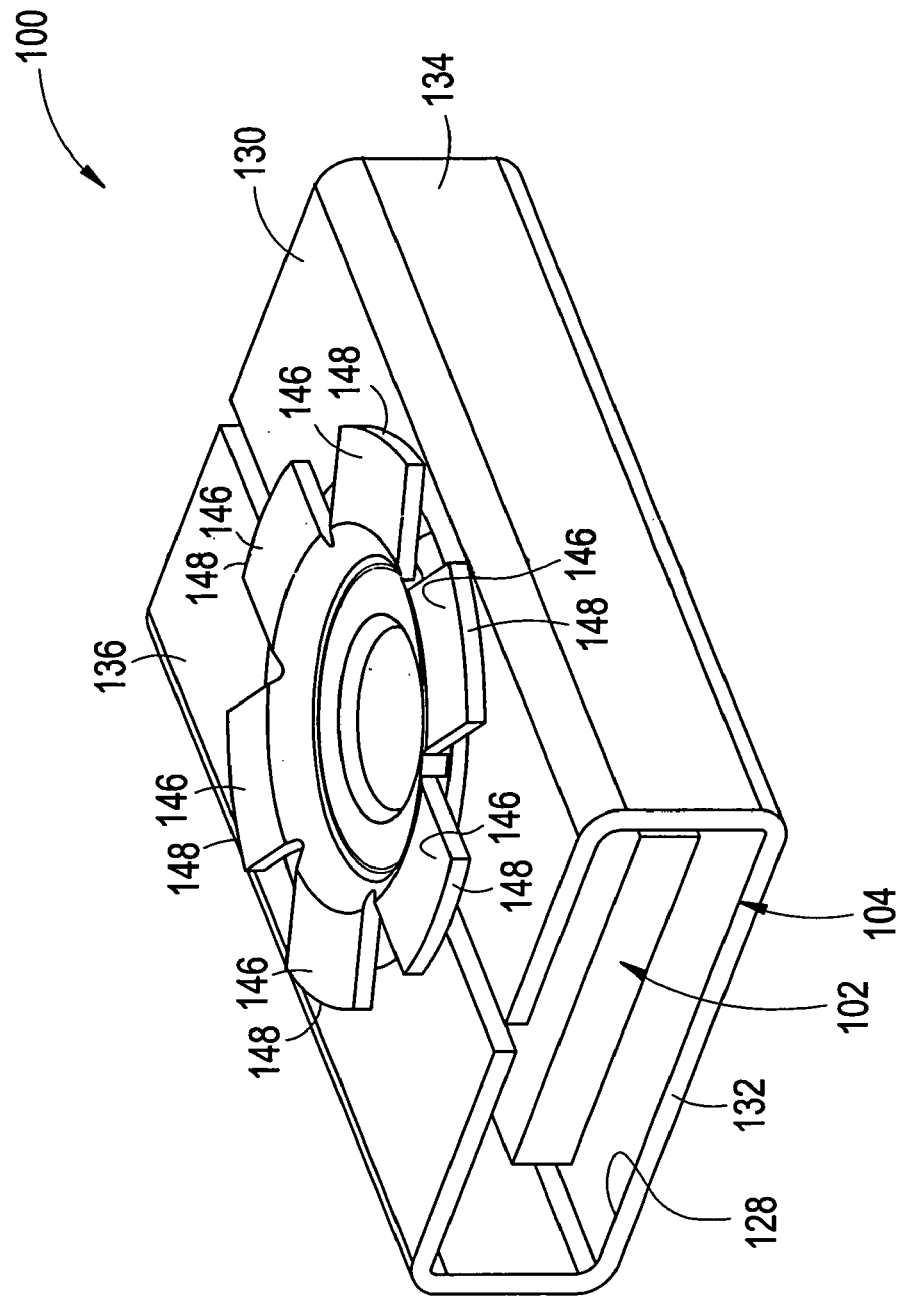
FIG. 3 is a perspective view of the cage nut assembly shown in FIG. 1, showing the flanges of the nut being folded down onto a cage.
Figure 4:
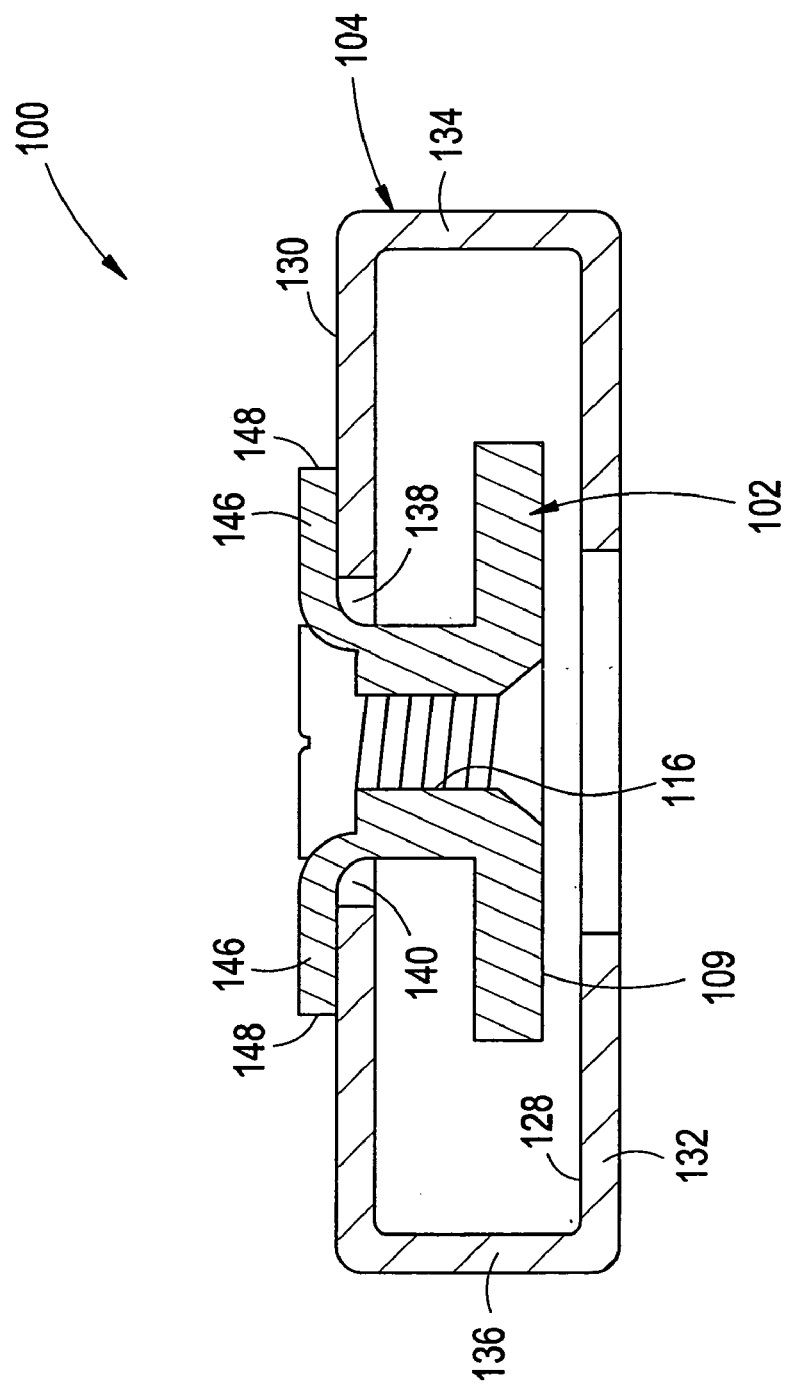
FIG. 4 is a cross-sectional view of the cage nut assembly shown in FIG. 3.

The flanges 146 are folded down onto the lower surface 130 of the cage nut 104 at the arm portions 134, 136 and are bent at an angle so as to preferably allow only minimal contact with the lower surface 130 of the cage nut 104 at the arm portions 134, 136, as best illustrated in FIGS. 3 and 4. A diameter of the flanges 146, measured from opposite edges 148 of the folded flanges 146 (the edges 148 of the flanges 146 were previously the top end 124 of the cylindrical member 112), is sized to be large enough to ensure that the nut 102 cannot fall through the semi-circular cutouts 138, 140 of the cage 104, e.g., the diameter of the flanges 146 being larger than a diameter of the semi-circular cutouts 138, 140. Thus, the nut 102 is able to float in the "X" and "Y" axes and the lower surface 109 of the nut 102 does not contact the upper surface 128 of the base portion 132 of the cage 104.

The lower surface 130 of the base portion 132 of the cage 104 is then welded to a workpiece 150. The workpiece 150 has an aperture 152 provided therethrough and first and second surfaces 154, 156. The lower surface 130 of the base portion 132 of the cage 104 is welded to the first surface 154 of the workpiece 150 such that the aperture 152 of the workpiece 150 is in communication with the aperture 137 through the base portion 132 of the cage 104, and with the aperture 114 which extends through the nut 102. The workpiece 150 and the cage 104 are then typically sent through an e-coat or ELPO bath that is meant to add a corrosion or paint coating to the first surface 154 of the workpiece 150. The folding over of the flanges 146 keeps the lower surface 109 of the nut 102 from coming into contact with the upper surface 128 of the base portion 132 of the cage 104, thus reducing the possibility that the cage 104 and the nut 102 will stick or adhere to each other after coating or welding is complete.

The fastener 118, such as a bolt or screw, which has a head portion 160 and a threaded shank portion 162 extending therefrom, is then connected to the cage nut assembly 100 and the workpiece 150. The fastener 118 is connected by inserting the threaded shank portion 162 of the fastener 118 through the aperture 152 of the workpiece 150, through the aperture 137 of the base portion 132 of the cage 104 and into the aperture 114 of the nut 102, such that the threaded shank portion 162 of the fastener 118 is threadedly engaged with the threaded aperture wall 116 of the nut 102, until the head portion 160 of the fastener 118 abuts against the second surface 156 of the workpiece 150.

Figure 5:
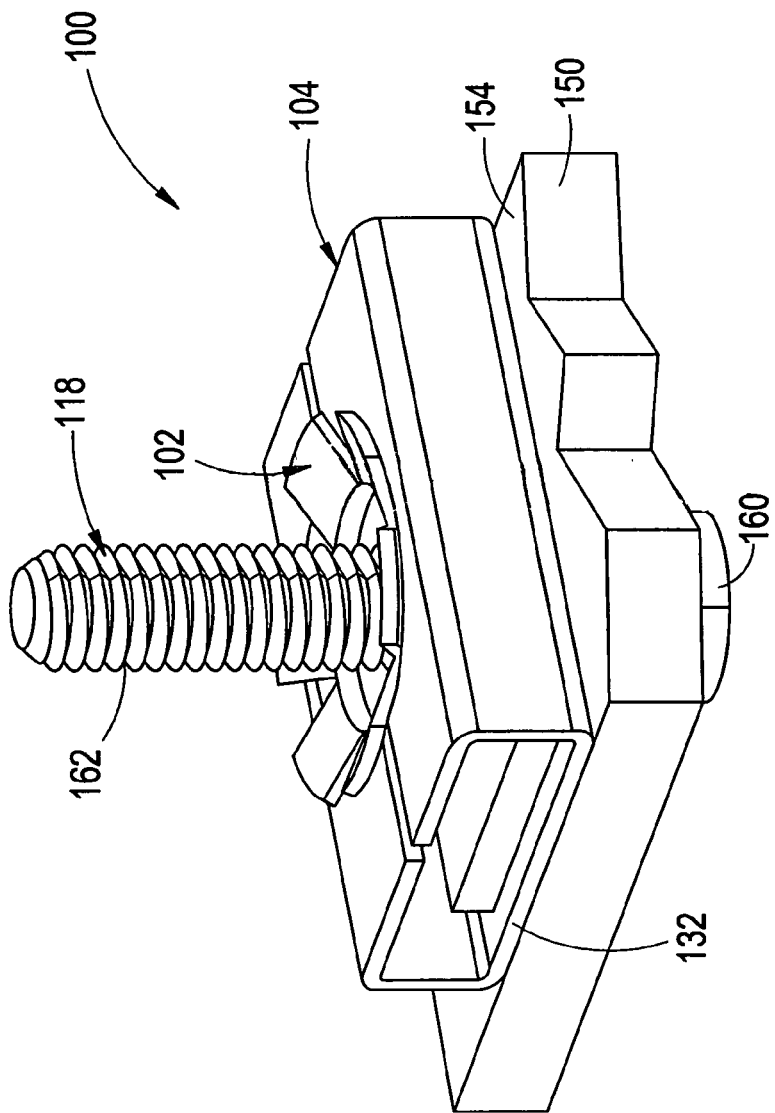
FIG. 5 is a perspective view of the cage nut assembly of FIGS. 1–4, showing the assembly being connected to a workpiece by a fastener.
Figure 6:
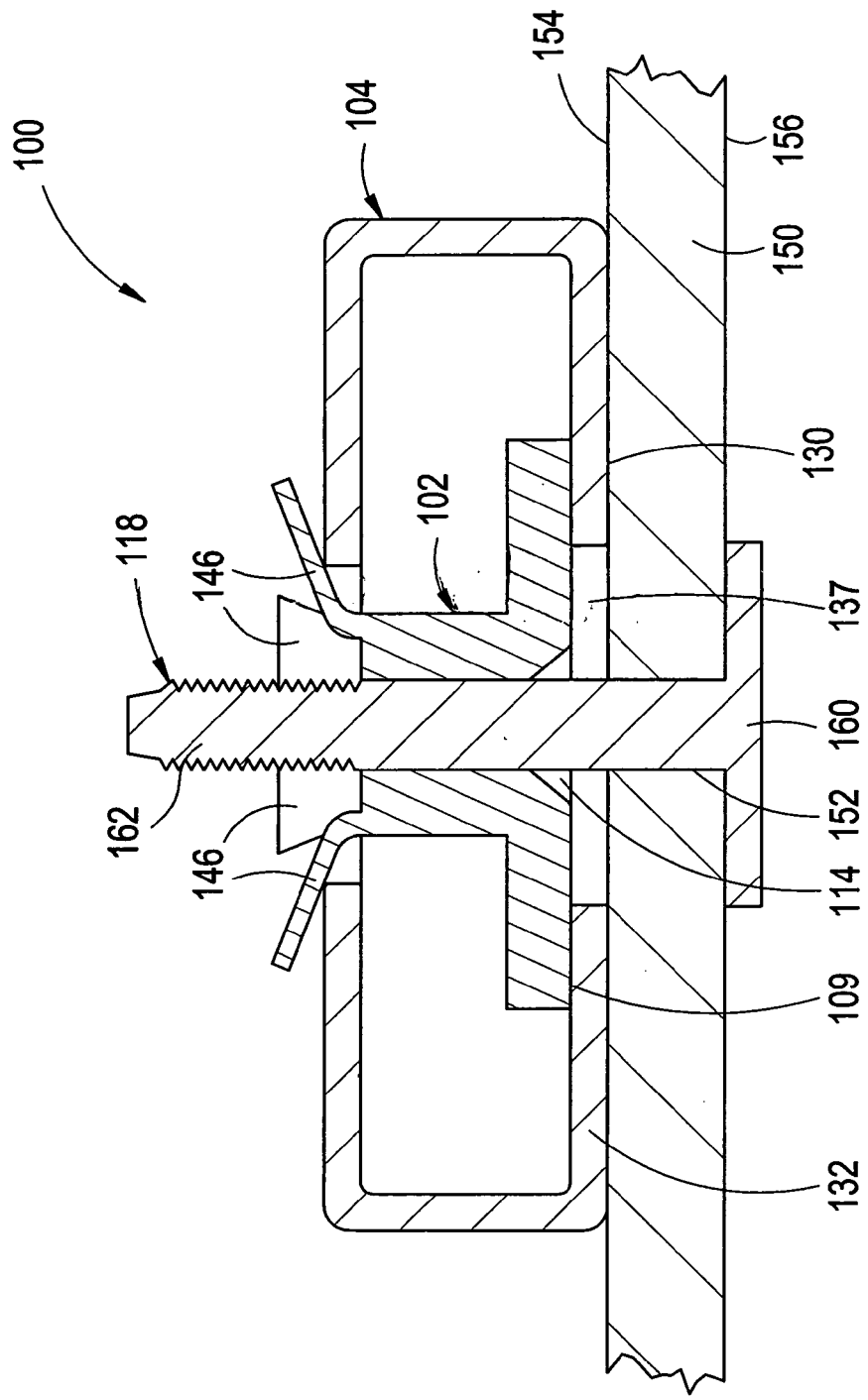
FIG. 6 is a cross-sectional view of the cage nut assembly shown in FIG. 5, showing the assembly being connected to a workpiece by a fastener.

As the fastener 118 is torqued into place, by threaded engagement with the aperture wall 116 of the nut 102, the rectangular plate 106 of the nut 102 is pulled down to interface with the upper surface 128 of the base portion 132 of the cage 104, thus providing a solid joint between the nut 102, the cage 104, the workpiece 150 and the fastener 118. The rectangular plate 106 is able to be pulled down to interface with the upper surface 128 of the base portion 132 of the cage 104 because the flanges 146 are bent upward, as illustrated in FIGS. 5 and 6, as the fastener 118 is torqued into place.

Attention is directed to a cage nut assembly 200 which is in accordance with a second embodiment of the present invention, and which is best illustrated in FIGS. 7–12. The cage nut assembly 200 includes a nut 202, a cage 204 and a bushing 270.

Figure 7:
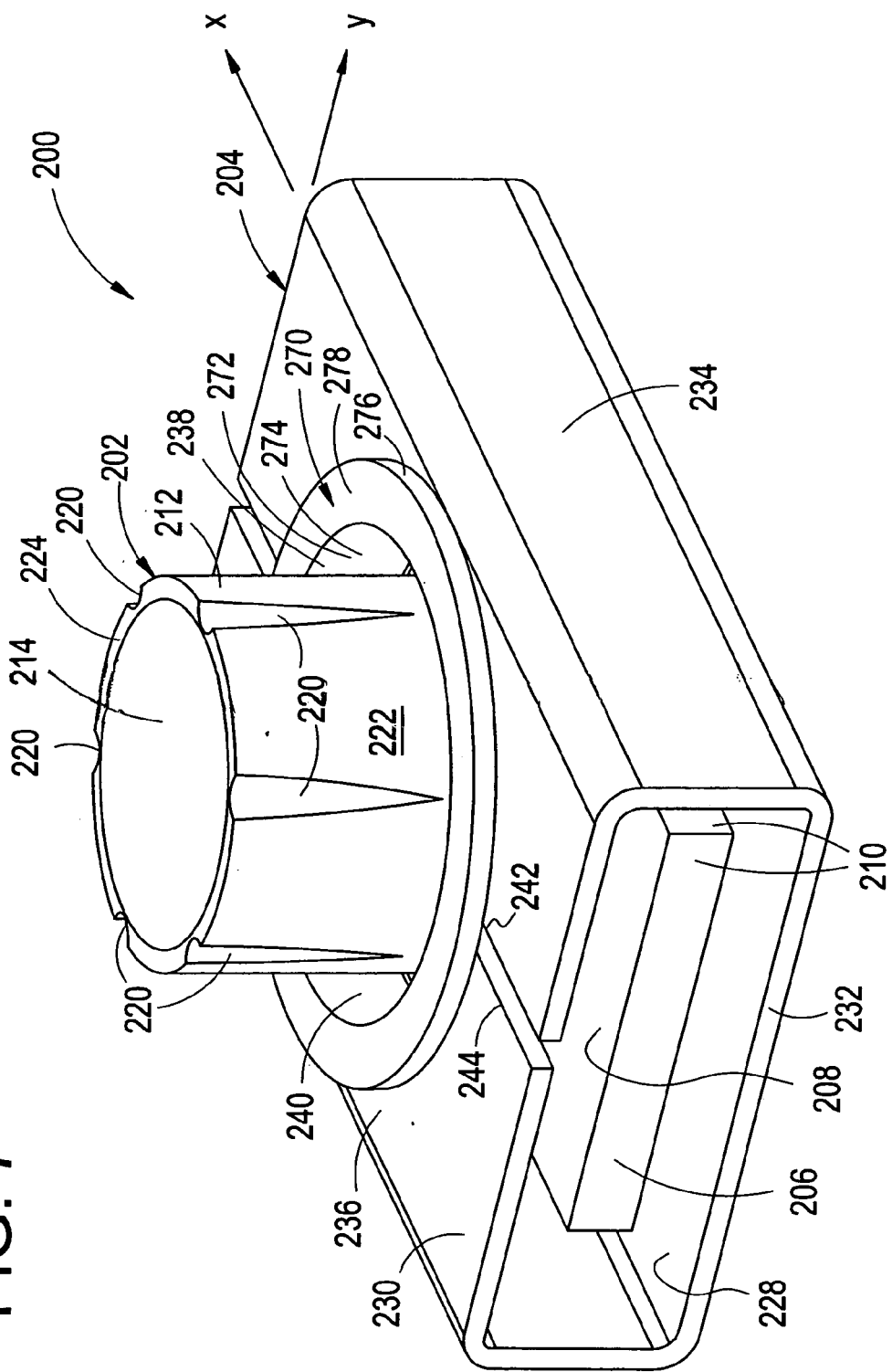
FIG. 7 is a perspective view of a cage nut assembly which is in accordance with a second embodiment of the invention.
Figure 8:
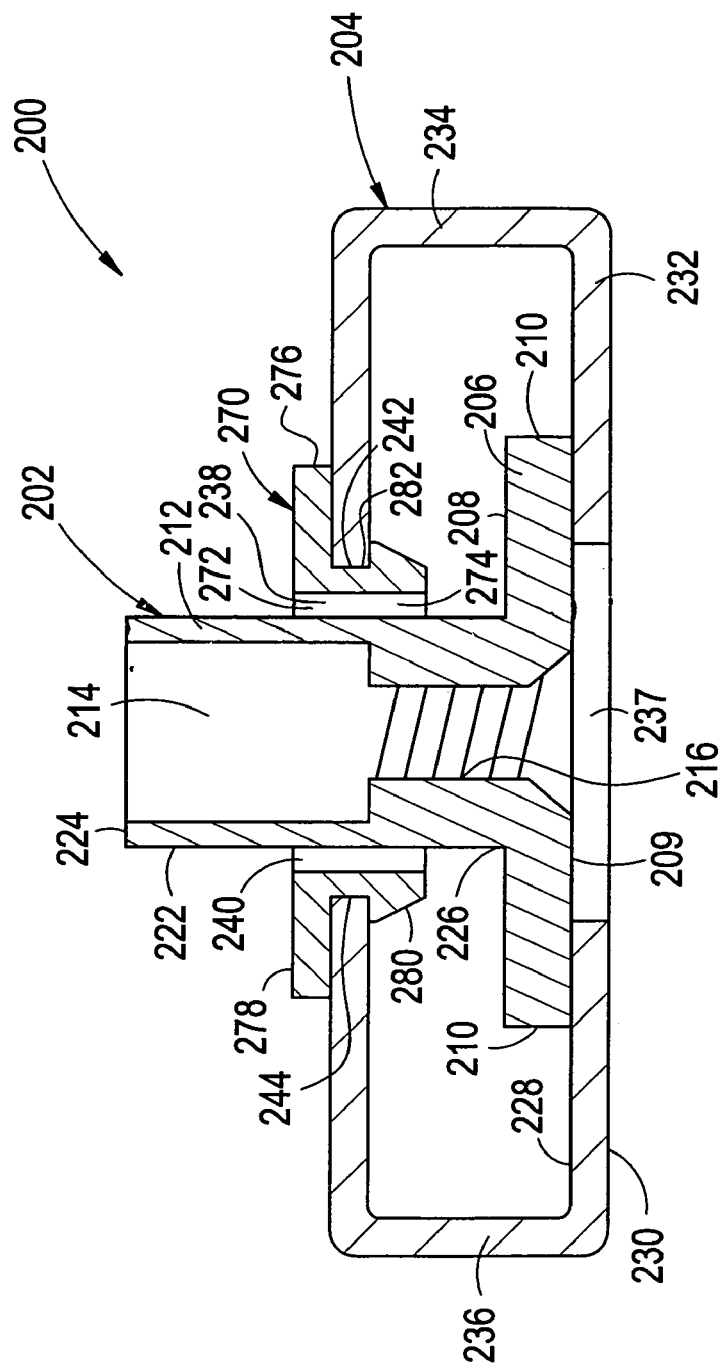
FIG. 8 is a cross-sectional view of the cage nut assembly shown in FIG. 7.

The nut 202 is best illustrated in FIGS. 7 and 8. The nut 202 includes a rectangular plate or base portion 206 having a generally planar upper surface 208, a generally planar lower surface 209, and sidewalls 210 which connect the upper surface 208 to the lower surface 209. The nut 202 also includes a cylindrical member 212 which extends outwardly from the upper surface 208 of the nut 202. The cylindrical member 212 is preferably in the form of a right circular cylinder. An aperture 214 extends through the nut 202 from the plate 206 into the cylindrical member 212. The aperture 214 maybe closed at the lower surface 209 of the plate 206 or it may, preferably, extend all the way through the plate 206. The aperture 214 defines an aperture wall 216 which is preferably threaded and is capable of receiving a fastener 218, such as a bolt or screw, to be attached thereto.

The cylindrical member 212 also preferably includes a plurality of indents 220 provided along an outer surface 222 of the cylindrical member 212. The indents 220 extend from a top end 224 of the cylindrical member 212 generally straight down toward a bottom end 226 of the cylindrical member 212, which is provided at a position where the cylindrical member 212 extends from the upper surface 208 of the plate 206.

The nut 202 may be formed by cold forming, stamping, or staking a nut member into a plate member. The nut 202 may then be heat treated, if desired, depending on the hardness of the material of the nut 202.

The cage 204 is used for encaging the nut 202. Prior to encaging the nut 202, the cage 204 has generally planar upper and lower surfaces 228, 230. The cage 204 includes a base portion 232 and bendable first and second arm portions 234, 236 extending from opposite ends of the base portion 232. The first and second arm portions 234, 236 are preferably integrally formed with the base portion 232.

An aperture 237 is provided through the base portion 232 of the cage 204 and the first and second arm portions 234, 236 have generally semi-circular cutouts 238, 240 at their free ends 242, 244.

The bushing 270 is a generally circular member having an aperture 272 provided therethrough defining an inner wall 274 and, thus, an inner diameter of the bushing 270. The bushing 270 also has an outer wall 276 which is defined by an upper flange 278 and a lower flange 280. The upper flange 278 extends radially outwardly from the inner wall 274 of the bushing 270 to the outer wall 276 of the bushing 270 and, thus, defines an outer diameter of the bushing 270 at the upper flange 278. The lower flange 280 extends radially outwardly from the inner wall 274 of the bushing 270 to the outer wall 276 of the bushing 270 and, thus, defines an outer diameter of the bushing 270 at the lower flange 280. The outer diameter of the bushing 270 at the lower flange 280 is preferably smaller than the outer diameter of the bushing 270 at the upper flange 278. The upper and lower flanges 278, 280 of the bushing 270 define a slot 282 therebetween such that the outer diameter of the bushing 270 at the slot 282 is less than the outer diameters of the bushing 270 at both the upper and lower flanges 278, 280. The bushing 270 is preferably formed of an electrically non-conductive material, such as plastic, and acts as an electro-plating inhibitor, as will be discussed further herein.

In operation, and as best illustrated in FIGS. 7–12, the nut 202 is positioned on the upper surface 228 of the base portion 232 such that the lower surface 209 of the nut 202 is placed flat on the upper surface 228 of the base portion 232.

The bushing 270 is positioned around the cylindrical member 212 of the nut 202 such that the cylindrical member 212 extends through the aperture 272 of the bushing 270.

Each of the arm portions 234, 236 is bent around one of the sidewalls 212 of the nut 202 and above the upper surface 208 of the nut 202. The free ends 242, 244 of the arm portions 234, 236 are typically spaced apart and are positioned within the slot 282 of the bushing 270 such that the semi-circular cutouts 238, 240 are in alignment with one another. A diameter of the semi-circular cutouts 238, 240 is slightly larger than the outer diameter of the bushing 270 at the slot 282, but is smaller than the outer diameters of the bushing 270 at the upper and lower flanges 278, 280 such that the bushing 270 cannot fall into the cage 204 through the semi-circular cutouts 238, 240. The slot 282 is sized for an interference fit with the arm portions 234, 236 such that the upper flange 278 is substantially in abutment with the lower surface 230 of the cage 204 at the arm portions 234, 236, and such that the lower flange 280 is substantially in abutment with the upper surface 228 of the cage 204 at the arm portion 234, 236. Thus, the bushing 270 is secured to the cage 204 with the cylindrical member 212 of the nut 202 extending through the aperture 272 of the bushing 270. The inner diameter of the bushing 270 must be larger than an outer diameter of the cylindrical member 212 of the nut 202.

Thus, the cage 204 effectively encages the nut 202 to form the cage nut assembly 200, which is best illustrated in FIGS. 7 and 8. The cage 204 is sized so that the nut 204 has a limited range of movement in at least one dimension, and preferably in two dimensions, for example the "X" and "Y" axes as illustrated in FIG. 7.

Once the cage nut assembly 200 is formed, a first portion (not shown) of a press (not shown) supports the lower surface 209 of the nut 202 off of the upper surface 228 of the base portion 232 of the cage 204, as the first portion of the press is capable of extending through the aperture 237 in the base portion 232 of the cage 204. A second portion (not shown) of the press then lowers onto the top end 224 of the cylindrical member 212 of the nut 202. The press then presses down onto the top end 224 of the cylindrical member 212 which results in the tearing of the cylindrical member 212 along the indents 220.

The tearing of the cylindrical member 212 along the indents 220 causes the nut 202 to collapse and provide a plurality of flanges 246. It should be noted that while the flanges 246 are preferably formed by indents 220 in the cylindrical member 212, the flanges 246 could also be preformed in the cylindrical member 212 such that they are connected by a webbing (not shown) or any other similar or equivalent construction, which would tear upon the press pressing down on the top end 224 of the cylindrical member 212. Alternatively, the flanges 246 could be preformed in the cylindrical member 212 such that they are separated by slits (not shown), which would allow for the flanges 246 to be bent down upon the press pressing down on the top end 224 of the cylindrical member 212.

Figure 9:
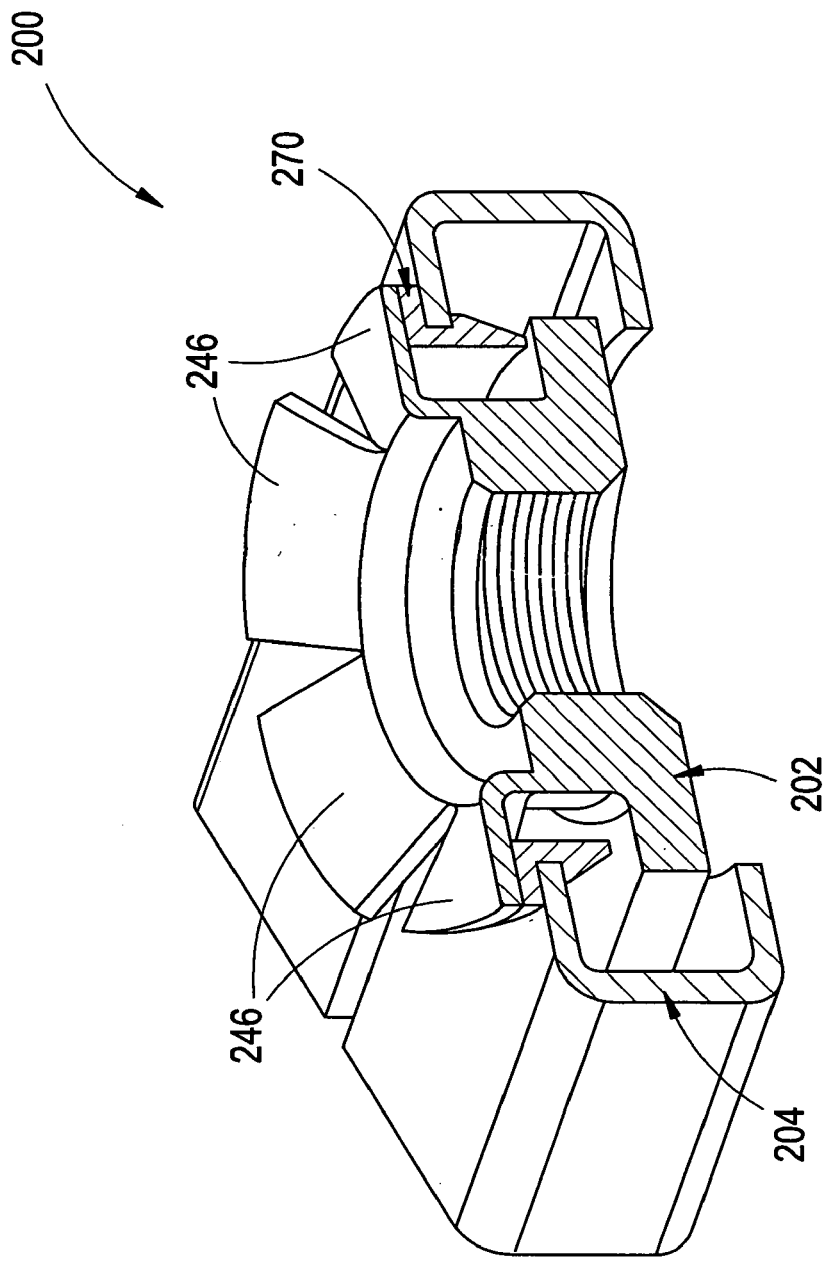
FIG. 9 is a perspective view of the cage nut assembly shown in FIG. 7, showing the flanges of the nut being folded down onto a bushing connected to a cage.
Figure 10:
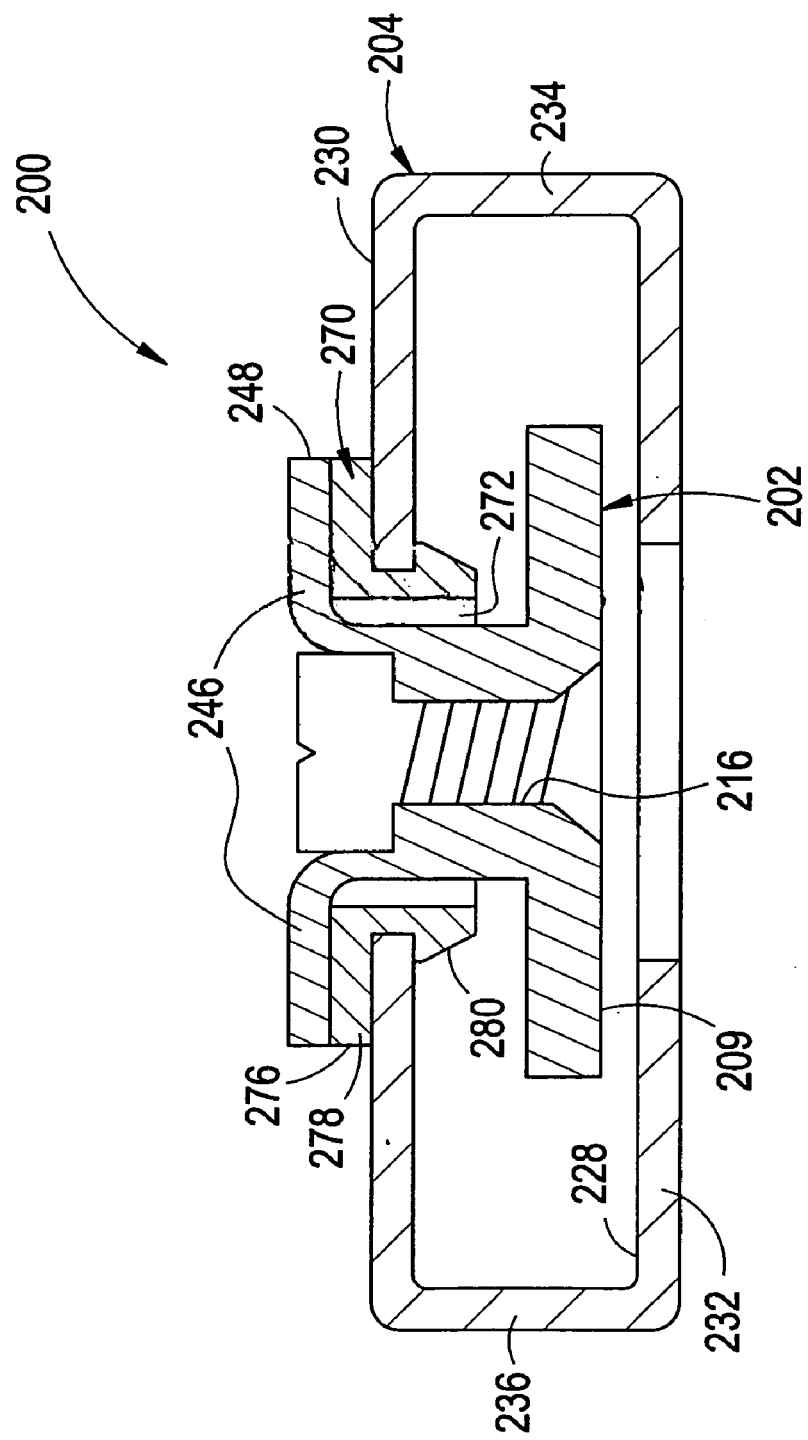
FIG. 10 is a cross-sectional view of the cage nut assembly shown in FIG. 9.

The flanges 246 are folded down against the bushing 270 such that edges 248 of the flanges 246 do not come into contact with the arm portions 234, 236 of the cage nut 204, as best illustrated in FIGS. 9 and 10.

A diameter of the flanges 246, measured from opposite edges 248 of the folded down flanges 246 (the edges 248 were previously the top end 224 of the cylindrical member 212), is sized to be large enough to ensure that the nut 202 cannot fall through the aperture 272 of the bushing 270, e.g., the diameter of the flanges 246 being larger than the inner diameter of the bushing 270. Thus, the nut 202 is able to float in the "X" and "Y" axes and the lower surface 209 of the nut 202 does not contact the upper surface 228 of the base portion 232 of the cage 204.

The lower surface 230 of the base portion 232 of the cage 204 is then welded to a workpiece 250. The workpiece 250 has an aperture 252 provided therethrough and first and second surfaces 254, 256. The lower surface 230 of the base portion 232 of the cage 204 is welded to the first surface 254 of the workpiece 250 such that the aperture 252 of the workpiece 250 is in communication with the aperture 237 through the base portion 232 of the cage 204, and with the aperture 214 which extends through the nut 202.

The workpiece 250 and the cage 204 are then typically sent through an e-coat or ELPO bath that is meant to add a corrosion or paint coating to the first surface 254 of the workpiece 250. The folding over of the flanges 246 keeps the lower surface 209 of the nut 202 from coming into contact with the upper surface 228 of the base portion 232 of the cage 204, thus reducing the possibility that the cage 204 and the nut 202 will stick or adhere to each other after coating or welding is complete.

Also, the bushing 270 acts as an electro-plating inhibitor. With the bushing 270 in place, there is no metal to metal contact between the nut 202 and the cage 204 such that when electricity moves through the cage 204 to deposit paint thereon, the nut 202 will not receive an electrical current and, thus, will not have paint deposited thereon. If the nut 202 and the cage 204 are in contact with one another, the nut 202 may have some paint deposited thereon which could cause problems with the nut 202 if the aperture wall 216 is finely threaded, as the paint or like will cause torqueing issues in the fine threads of the aperture wall 216. If the aperture wall 216 of the nut 202 is not finely threaded, but rather is coarsely threaded, the deposit of paint or the like on the threads of the aperture wall 216 is not as big a concern with regard to torqueing issues.

The fastener 218, such as a bolt or screw, which has a head portion 260 and a threaded shank portion 262 extending therefrom, is then connected to the cage nut assembly 200 and the workpiece 250. The fastener 218 is connected by inserting the threaded shank portion 262 of the fastener 218 through the aperture 252 of the workpiece 250, through the aperture 237 of the base portion 232 of the cage 204 and into the aperture 214 of the nut 202, such that the threaded shank portion 262 of the fastener 218 is threadedly engaged with the threaded aperture wall 216 of the nut 202, until the head portion 260 of the fastener 218 abuts against the second surface 256 of the workpiece 250.

Figure 11:
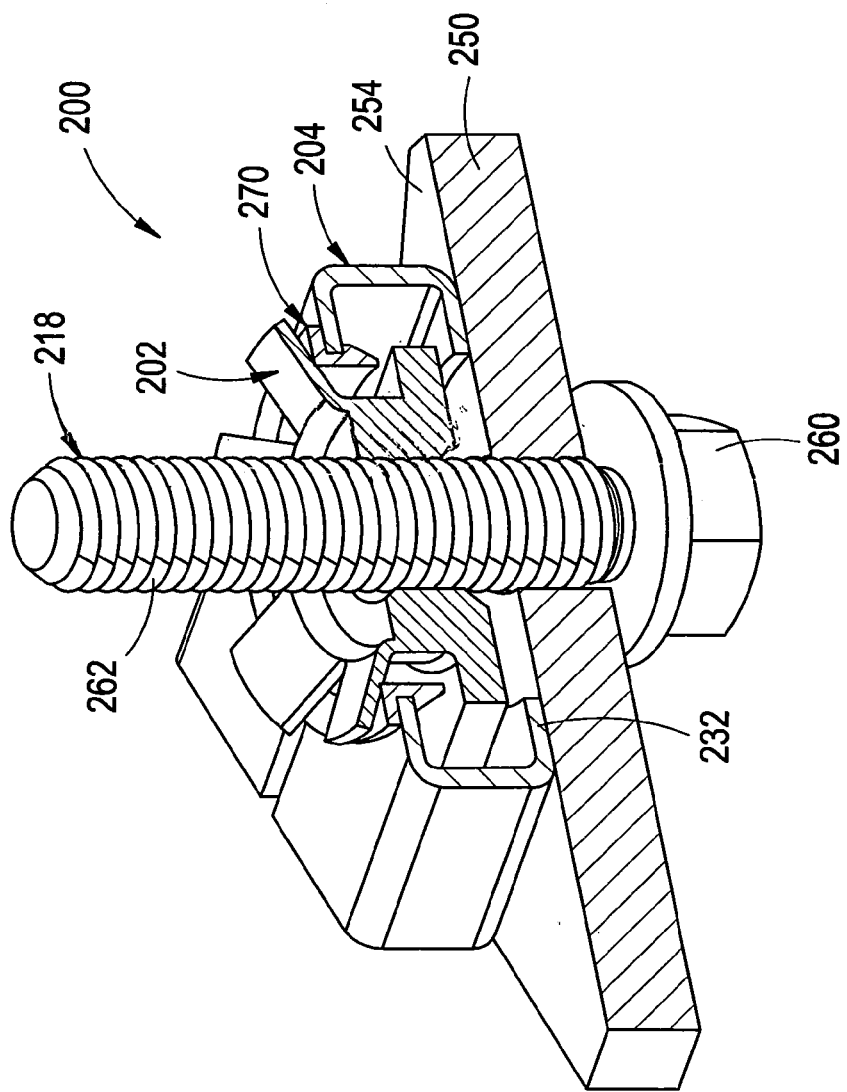
FIG. 11 is a perspective view of the cage nut assembly of FIGS. 7–10, showing the assembly being connected to a workpiece by a fastener.
Figure 12:
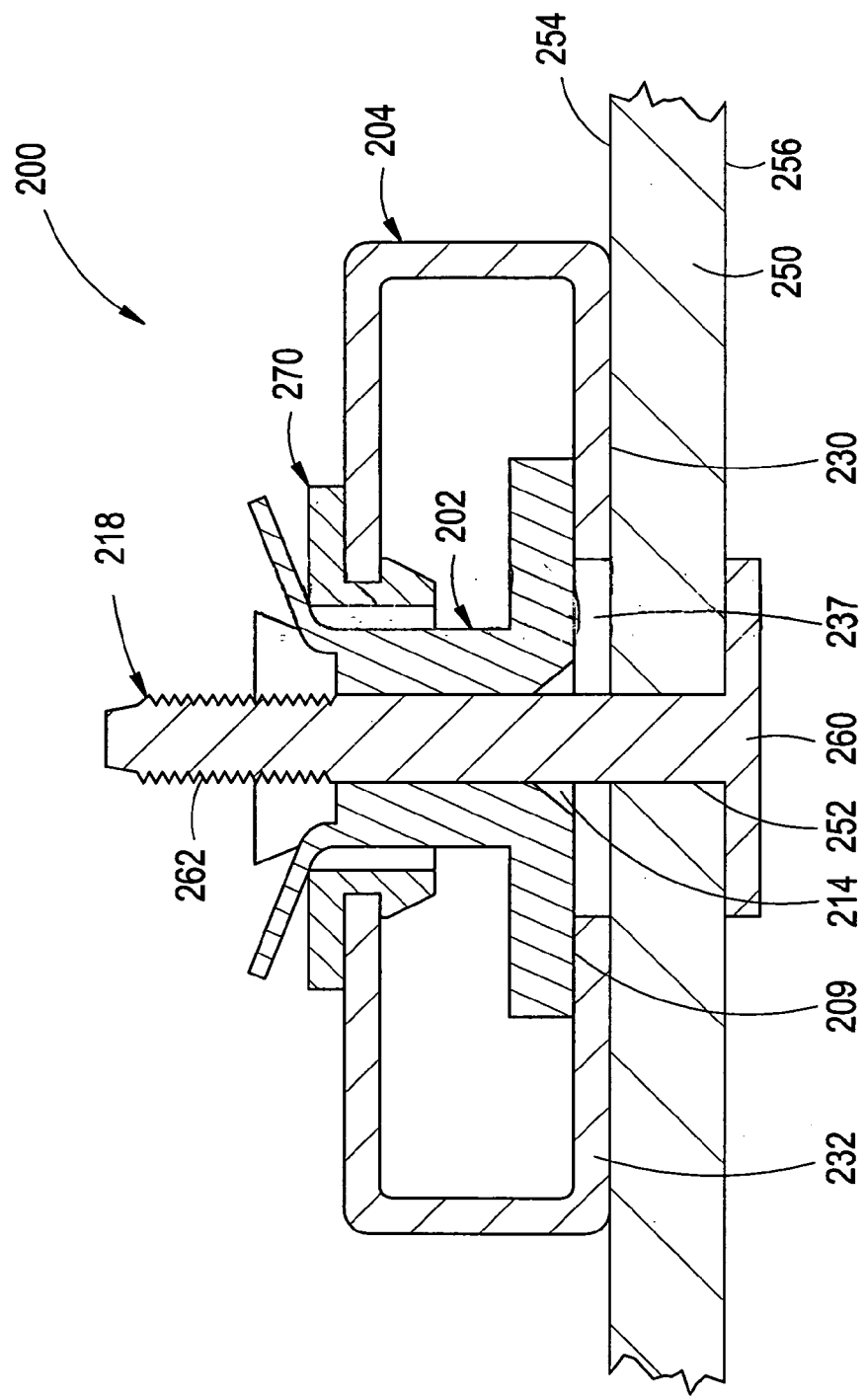
FIG. 12 is a cross-sectional view of the cage nut assembly shown in FIG. 11, showing the assembly being connected to a workpiece by a fastener.

As the fastener 218 is torqued into place, by threaded engagement with the aperture wall 216 of the nut 202, the rectangular plate 206 of the nut 202 is pulled down to interface with the upper surface 228 of the base portion 232 of the cage 204, thus providing a solid joint between the nut 202, the cage 204, the bushing 270, the workpiece 250 and the fastener 218. The rectangular plate 206 is able to be pulled down to interface with the upper surface 228 of the base portion 232 of the cage 204 because the flanges 246 are bent upward, as illustrated in FIGS. 11 and 12, as the fastener 218 is torqued into place.

Attention is directed to a cage nut assembly 300 which is in accordance with a third embodiment of the present invention, and which is best illustrated in FIGS. 13–18. The cage nut assembly 300 includes a nut 302 and a cage 304.

Figure 13:
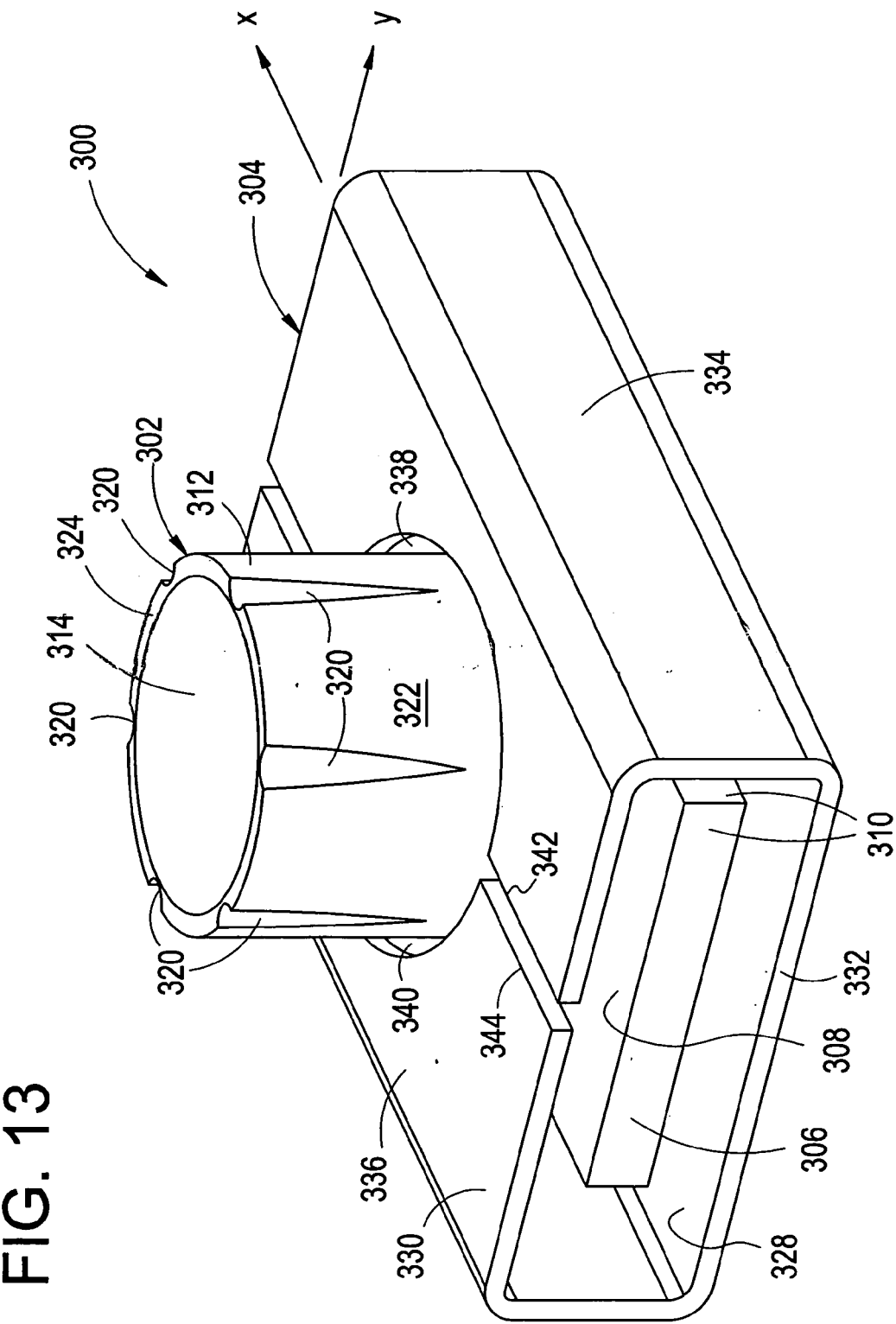
FIG. 13 is a perspective view of a cage nut assembly which is in accordance with a third embodiment of the invention.
Figure 14:
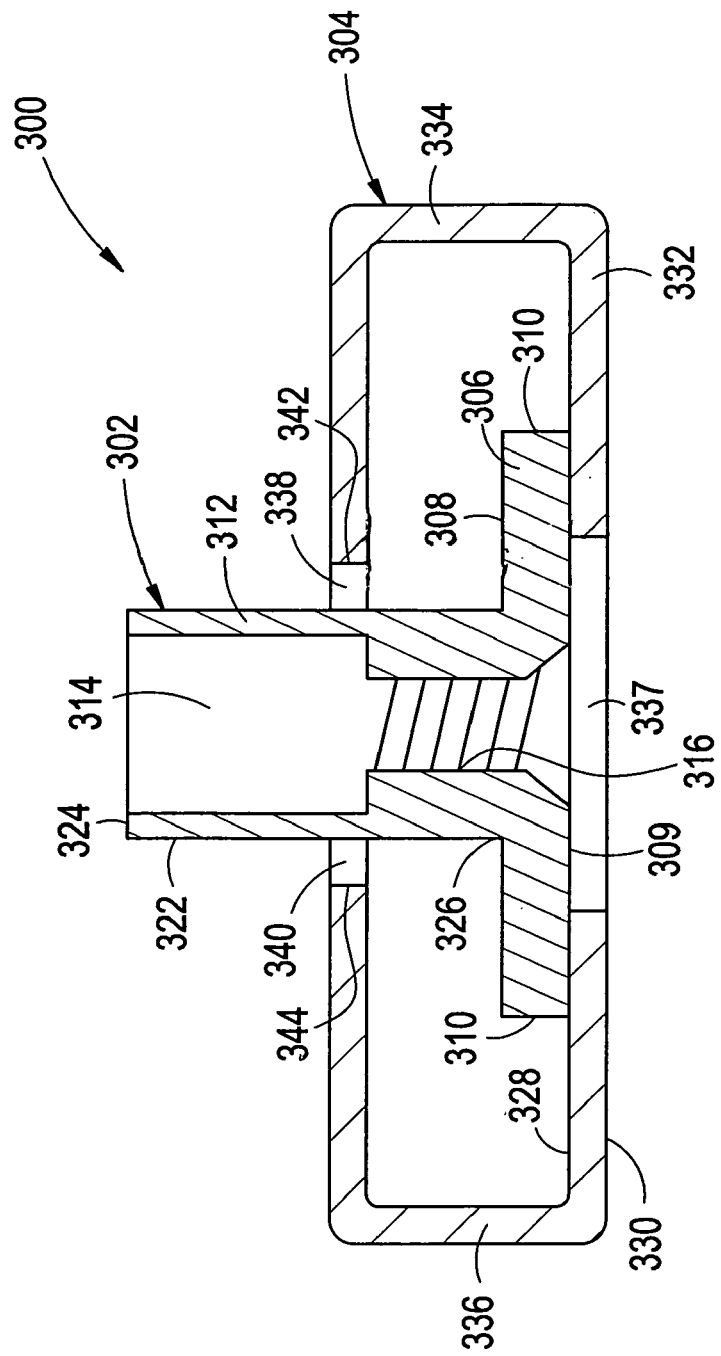
FIG. 14 is a cross-sectional view of the cage nut assembly shown in FIG. 13.

The nut 302 is best illustrated in FIGS. 13 and 14. The nut 302 includes a rectangular plate or base portion 306 having a generally planar upper surface 308, a generally planar lower surface 309, and sidewalls 310 which connect the upper surface 308 to the lower surface 309. The nut 302 also includes a cylindrical member 312 which extends outwardly from the upper surface 308 of the nut 302. The cylindrical member 312 is preferably in the form of a right circular cylinder. An aperture 314 extends through the nut 302 from the plate 306 into the cylindrical member 312. The aperture 314 may be closed at the lower surface 309 of the plate 306 or it may, preferably, extend all the way through the plate 306. The aperture 314 defines an aperture wall 316 which is preferably threaded and is capable of receiving a fastener 318, such as a bolt or screw, to be attached thereto.

The cylindrical member 312 also preferably includes a plurality of indents 320 provided along an outer surface 322 of the cylindrical member 312. The indents 320 extend from a top end 324 of the cylindrical member 312 generally straight down toward a bottom end 326 of the cylindrical member 312, which is provided at a position where the cylindrical member 312 extends from the upper surface 308 of the plate 306.

The nut 302 may be formed by cold forming, stamping, or staking a nut member into a plate member. The nut 302 may then be heat treated, if desired, depending on the hardness of the material of the nut 302.

The cage 304 is used for encaging the nut 302. Prior to encaging the nut 302, the cage 304 has generally planar upper and lower surfaces 328, 330. The cage 304 includes a base portion 332 and bendable first and second arm portions 334, 336 extending from opposite ends of the base portion 332. The first and second arm portions 334, 336 are preferably integrally formed with the base portion 332.

An aperture 337 is provided through the base portion 332 of the cage 304 and the first and second arm portions 334, 336 have generally semi-circular cutouts 338, 340 at their free ends 342, 344.

In operation, and as best illustrated in FIGS. 13–18, the nut 302 is positioned on the upper surface 328 of the base portion 332 such that the lower surface 309 of the nut 302 is placed flat on the upper surface 328 of the base portion 332.

Each of the arm portions 334, 336 is then bent around one of the sidewalls 312 of the nut 302 and above the upper surface 308 of the nut 302. The free ends 342, 344 of the arm portions 334, 336 are typically spaced apart and the semi-circular cutouts 338, 340 are in alignment with one another. The cylindrical member 312 of the nut 302 extends through the semi-circular cutouts 338, 340. Thus, the cage 304 effectively encages the nut 302 to form the cage nut assembly 300, which is best illustrated in FIGS. 13 and 14. The cage 304 is sized so that the nut 302 has a limited range of movement in at least one dimension, and preferably in two dimensions, for example the "X" and "Y" axes as illustrated in FIG. 13.

Once the cage nut assembly 300 is formed, a first portion (not shown) of a press (not shown) supports the lower surface 309 of the nut 302 off of the upper surface 328 of the base portion 332 of the cage 304, as the first portion of the press is capable of extending through the aperture 337 in the base portion 332 of the cage 304. A second portion (not shown) of the press then lowers onto the top end 324 of the cylindrical member 312 of the nut 302. The press then presses down onto the top end 324 of the cylindrical member 312 which results in the tearing of the cylindrical member 312 along the indents 320.

The tearing of the cylindrical member 312 along the indents 320 causes the nut 302 to collapse and provide a plurality of flanges 346. It should be noted that while the flanges 346 are preferably formed by indents 320 in the cylindrical member 312, the flanges 346 could also be preformed in the cylindrical member 312 such that they are connected by a webbing (not shown) or any other similar or equivalent construction, which would tear upon the press pressing down on the top end 324 of the cylindrical member 312. Alternatively, the flanges 346 could be preformed in the cylindrical member 312 such that they are separated by slits (not shown), which would allow for the flanges 346 to be bent down upon the press pressing down on the top end 324 of the cylindrical member 312.

Figure 15:
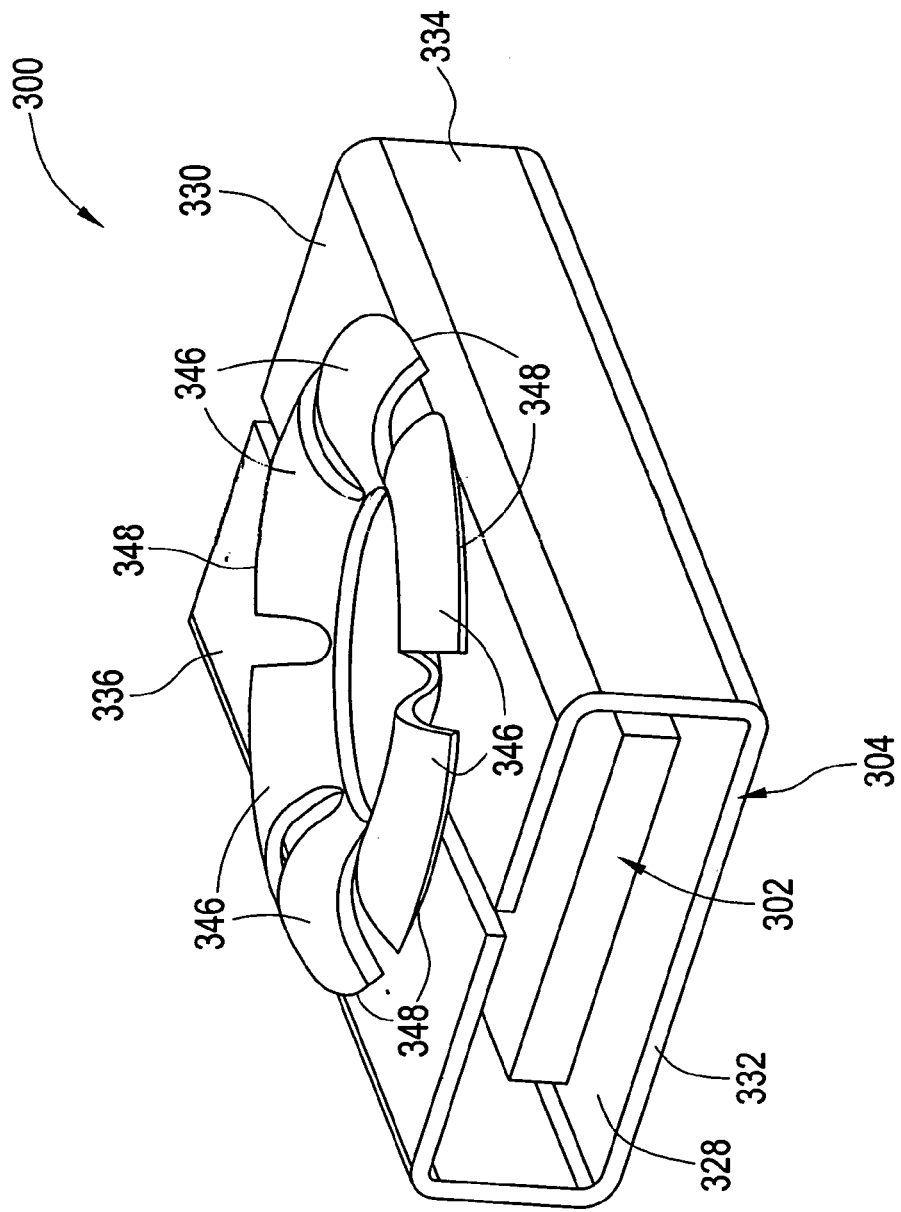
FIG. 15 is a perspective view of the cage nut assembly shown in FIG. 13, showing the flanges of the nut being curved/mushroomed down onto a cage.
Figure 16:
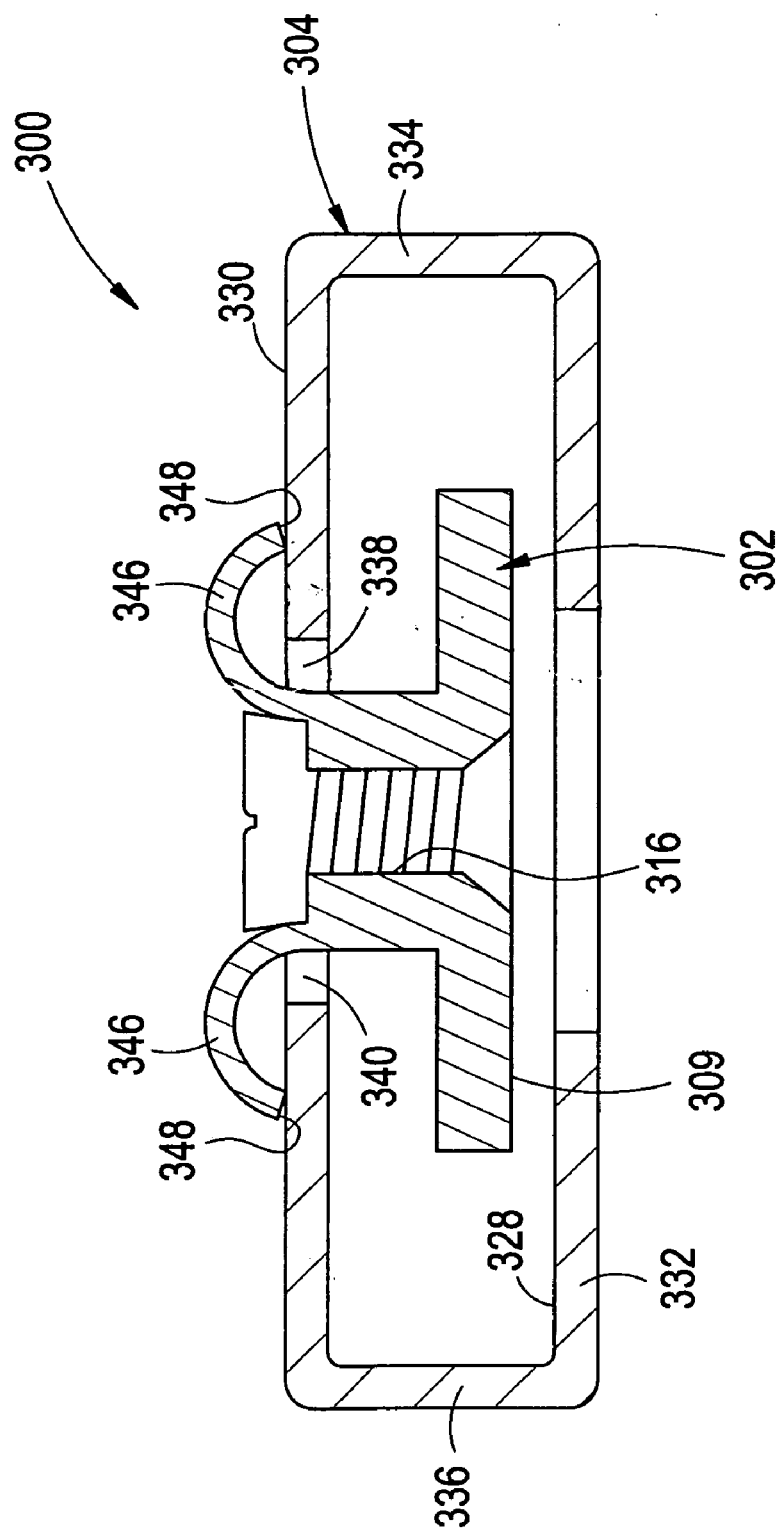
FIG. 16 is a cross-sectional view of the cage nut assembly shown in FIG. 15.

The flanges 346 are curved or mushroomed such that only edges 348 of the flanges 346 contact the lower surface 330 of the cage nut 304 at the arm portions 334, 336. Thus, the nut 302 has only minimal contact with the lower surface 330 of the cage 304 at the arm portions 334, 336, as best illustrated in FIGS. 15 and 16. A diameter of the flanges 346, measured from opposite edges 348 of the curved/mushroomed flanges 346 (the edges 348 of the flanges 346 were previously the top end 324 of the cylindrical member 312), is sized to be large enough to ensure that the nut 302 cannot fall through the semi-circular cutouts 338, 340 of the cage 304, e.g., the diameter of the flanges 346 being larger than a diameter of the semicircular cutouts 338, 340. Thus, the nut 302 is able to float in the "X" and "Y" axes and the lower surface 309 of the nut 302 does not contact the upper surface 328 of the base portion 332 of the cage 304.

The lower surface 330 of the base portion 332 of the cage 304 is then welded to a workpiece 350. The workpiece 350 has an aperture 352 provided therethrough and first and second surfaces 354, 356. The lower surface 330 of the base portion 332 of the cage 304 is welded to the first surface 354 of the workpiece 350 such that the aperture 352 of the workpiece 350 is in communication with the aperture 337 through the base portion 332 of the cage 304, and with the aperture 314 which extends through the nut 302. The workpiece 350 and the cage 304 are then typically sent through an e-coat or ELPO bath that is meant to add a corrosion or paint coating to the first surface 354 of the workpiece 350. The curving/mushrooming of the flanges 346 keeps the lower surface 309 of the nut 302 from coming into contact with the upper surface 328 of the base portion 332 of the cage 304, thus reducing the possibility that the cage 304 and the nut 302 will stick or adhere to each other after coating or welding is complete.

The fastener 318, such as a bolt or screw, which has a head portion 360 and a threaded shank portion 362 extending therefrom, is then connected to the cage nut assembly 300 and the workpiece 350. The fastener 318 is connected by inserting the threaded shank portion 362 of the fastener 318 through the aperture 352 of the workpiece 350, through the aperture 337 of the base portion 332 of the cage 304 and into the aperture 314 of the nut 302, such that the threaded shank portion 362 of the fastener 318 is threadedly engaged with the threaded aperture wall 316 of the nut 302, until the head portion 360 of the fastener 318 abuts against the second surface 356 of the workpiece 350.

Figure 17:
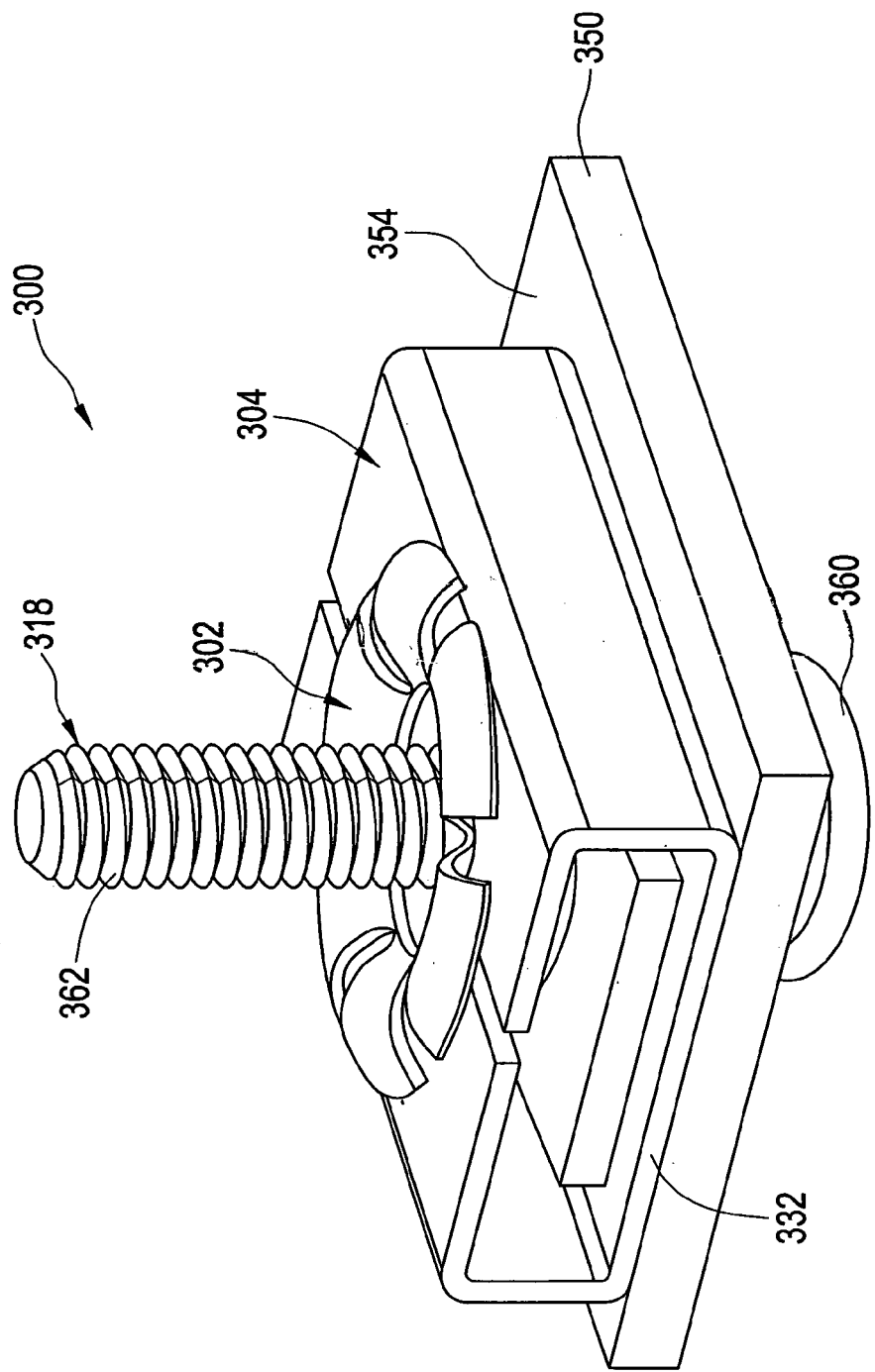
FIG. 17 is a perspective view of the cage nut assembly of FIGS. 13–16, showing the assembly being connected to a workpiece by a fastener.
Figure 18:
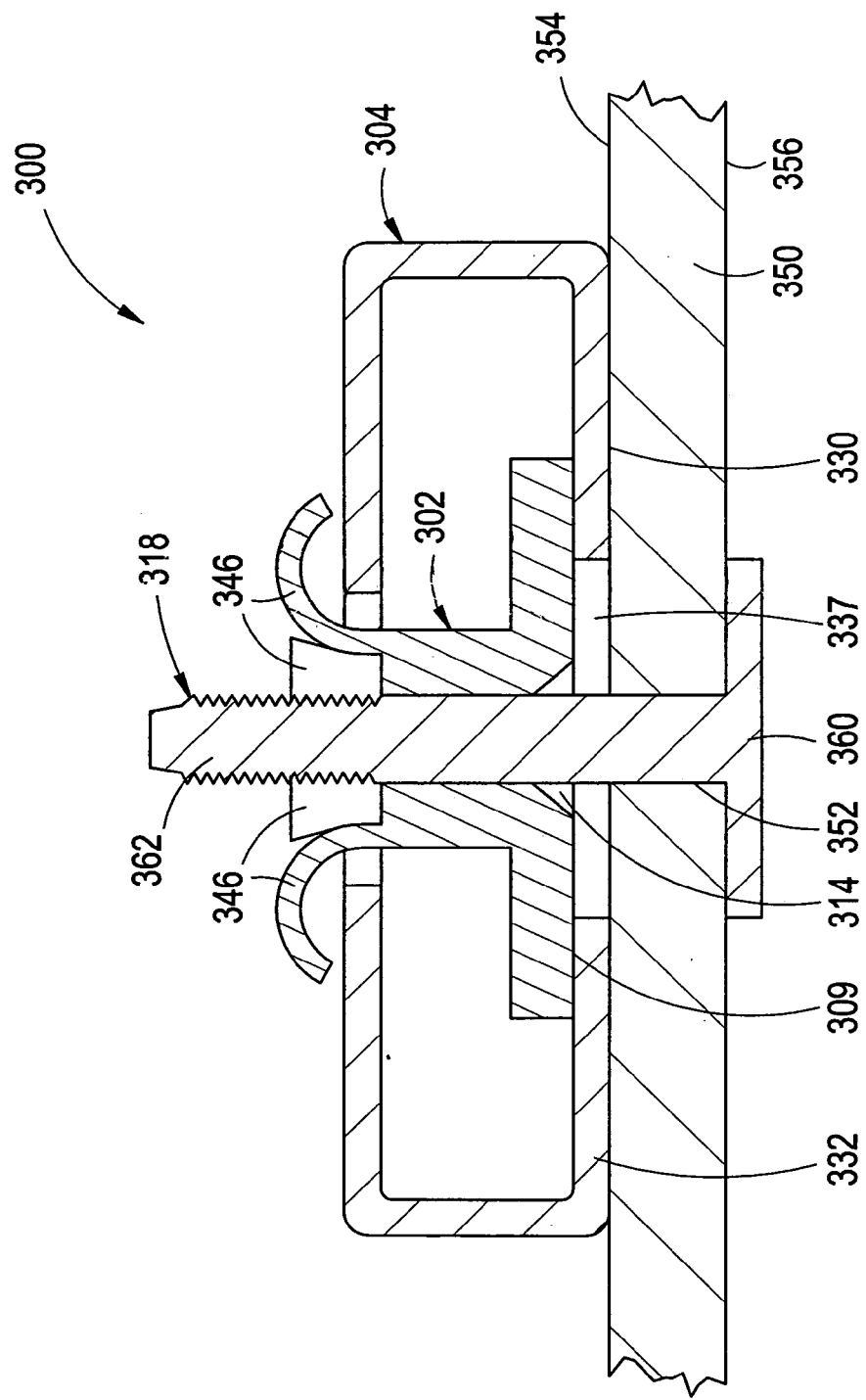
FIG. 18 is a cross-sectional view of the cage nut assembly shown in FIG. 17, showing the assembly being connected to a workpiece by a fastener.

As the fastener 318 is torqued into place, by threaded engagement with the aperture wall 316 of the nut 302, the rectangular plate 306 of the nut 302 is pulled down to interface with the upper surface 328 of the base portion 332 of the cage 304, thus providing a solid joint between the nut 302, the cage 304, the workpiece 350 and the fastener 318. The rectangular plate 306 is able to be pulled down to interface with the upper surface 328 of the base portion 332 of the cage 304 because the flanges 346 are bent upward, as illustrated in FIGS. 17 and 18, as the fastener 318 is torqued into place.

Attention is directed to a cage nut assembly 400 which is in accordance with a fourth embodiment of the present invention, and which is best illustrated in FIGS. 19–24. The cage nut assembly 400 includes a nut 402, a cage 404 and a bushing 470.

Figure 19:
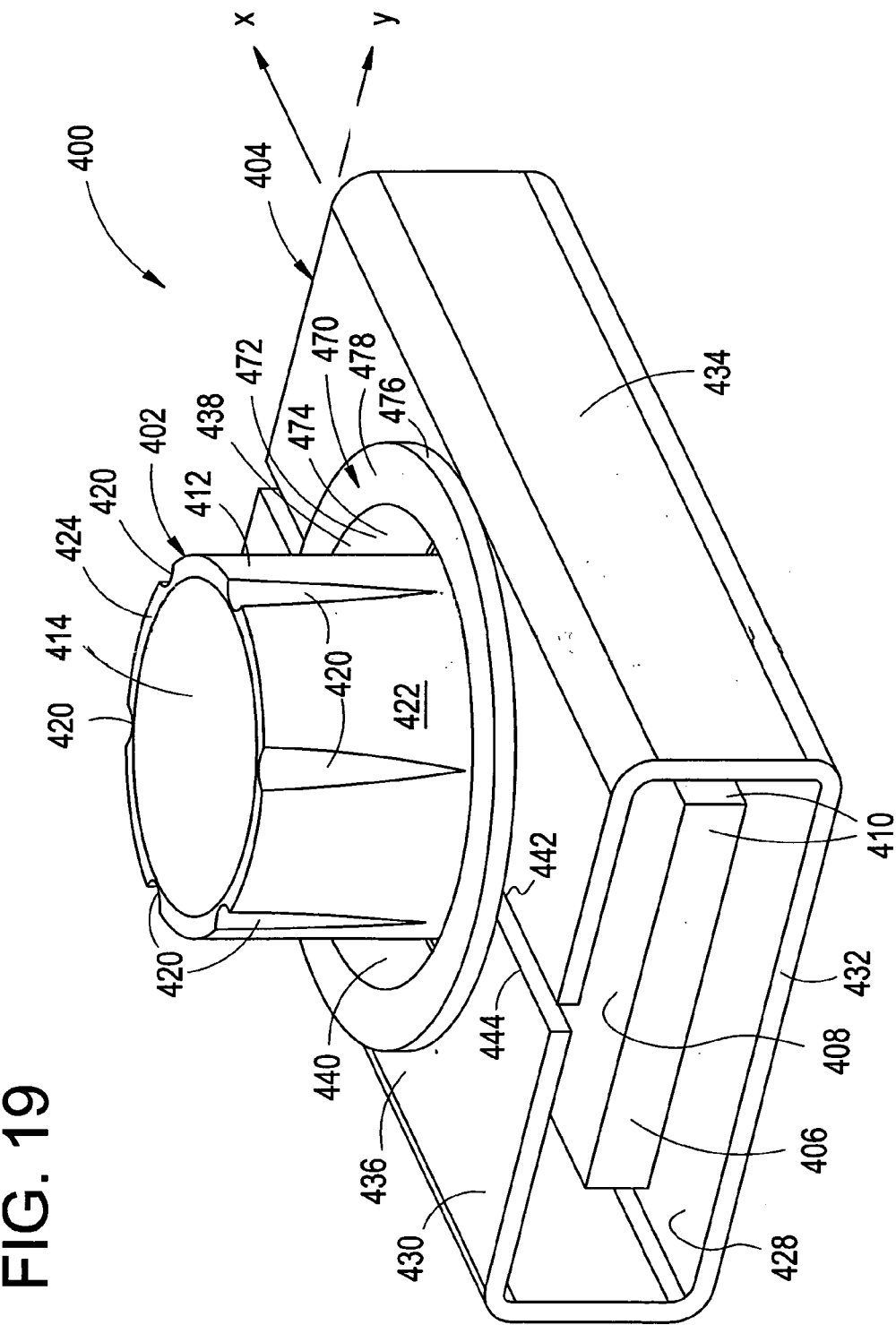
FIG. 19 is a perspective view of a cage nut assembly which is in accordance with a fourth embodiment of the invention.
Figure 20:
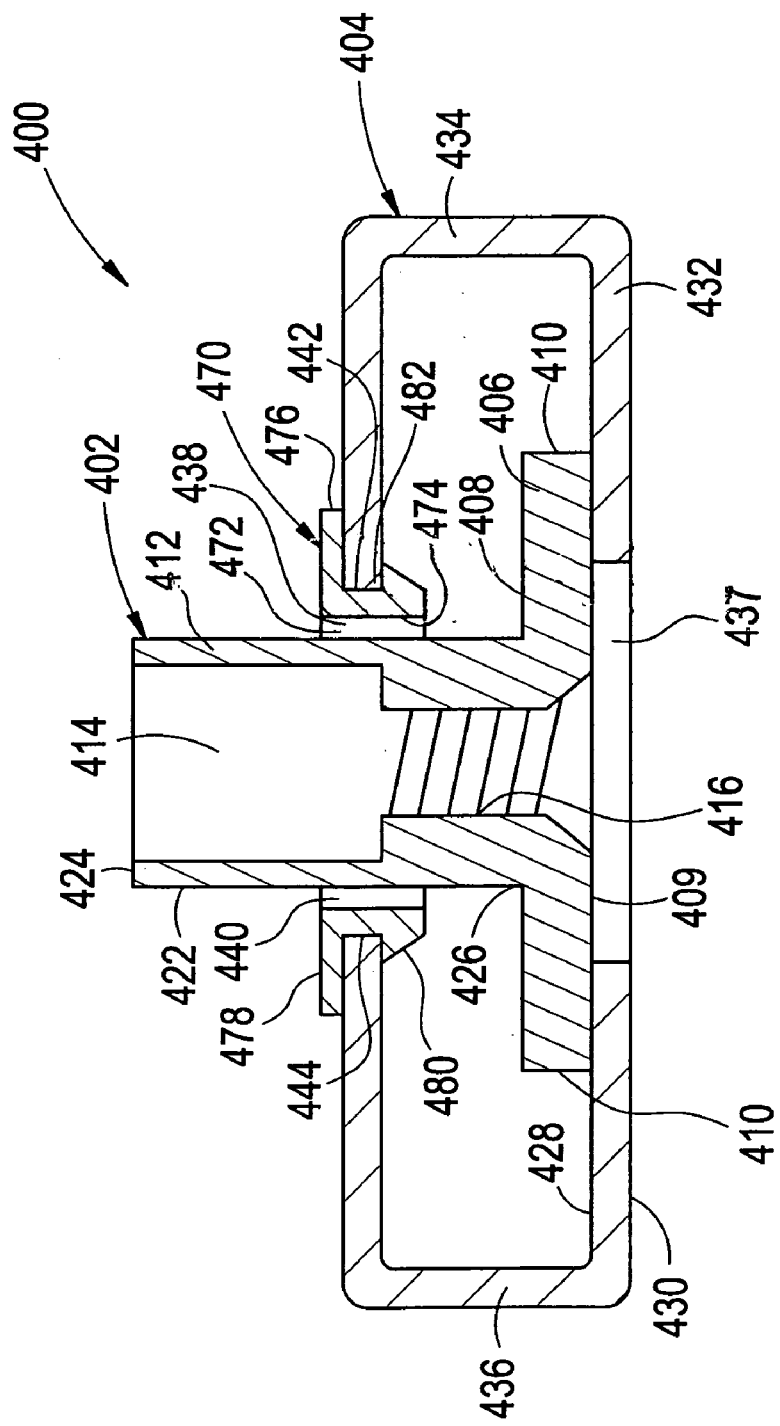
FIG. 20 is a cross-sectional view of the cage nut assembly shown in FIG. 19.

The nut 402 is best illustrated in FIGS. 19 and 20. The nut 402 includes a rectangular plate base portion 406 having a generally planar upper surface 408, a generally planar lower surface 409, and sidewalls 410 which connect the upper surface 408 to the lower surface 409. The nut 402 also includes a cylindrical member 412 which extends outwardly from the upper surface 408 of the nut 402. The cylindrical member 412 is preferably in the form of a right circular cylinder. An aperture 414 extends through the nut 402 from the plate 406 into the cylindrical member 412. The aperture 414 may be closed at the lower surface 409 of the plate 406 or it may, preferably, extend all the way through the plate 406. The aperture 414 defines an aperture wall 416 which is preferably threaded and is capable of receiving a fastener 418, such as a bolt or screw, to be attached thereto.

The cylindrical member 412 also preferably includes a plurality of indents 420 provided along an outer surface 422 of the cylindrical member 412. The indents 420 extend from a top end 424 of the cylindrical member 412 generally straight down toward a bottom end 426 of the cylindrical member 412, which is provided at a position where the cylindrical member 412 extends from the upper surface 408 of the plate 406.

The nut 402 may be formed by cold forming, stamping, or staking a nut member into a plate member. The nut 402 may then be heat treated, if desired, depending on the hardness of the material of the nut 402.

The cage 404 is used for encaging the nut 402. Prior to encaging the nut 402, the cage 404 has generally planar upper and lower surfaces 428, 430. The cage 404 includes a base portion 432 and bendable first and second arm portions 434, 436 extending from opposite ends of the base portion 432. The first and second arm portions 434, 436 are preferably integrally formed with the base portion 432.

An aperture 437 is provided through the base portion 432 of the cage 404 and the first and second arm portions 434, 436 have generally semi-circular cutouts 438, 440 at their free ends 442, 444.

The bushing 470 is a generally circular member having an aperture 472 provided therethrough defining an inner wall 474 and, thus, an inner diameter of the bushing 470. The bushing 470 also has an outer wall 476 which is defined by an upper flange 478 and a lower flange 480. The upper flange 478 extends radially outwardly from the inner wall 474 of the bushing 470 to the outer wall 476 of the bushing 470 and, thus, defines an outer diameter of the bushing 470 at the upper flange 478. The lower flange 480 extends radially outwardly from the inner wall 474 of the bushing 470 to the outer wall 476 of the bushing 470 and, thus, defines an outer diameter of the bushing 470 at the lower flange 480. The outer diameter of the bushing 470 at the lower flange 480 is preferably smaller than the outer diameter of the bushing 470 at the upper flange 480. The upper and lower flanges 478, 480 of the bushing 470 define a slot 482 therebetween such that the outer diameter of the bushing 470 at the slot 482 is less than the outer diameters of the bushing 470 at both the upper and lower flanges 478, 480. The bushing 470 is preferably formed of an electrically non-conductive material, such as plastic, and acts as an electro-plating inhibitor, as will be discussed further herein.

In operation, and as best illustrated in FIGS. 19–24, the nut 402 is positioned on the upper surface 428 of the base portion 432 such that the lower surface 409 of the nut 402 is placed flat on the upper surface 428 of the base portion 432.

The bushing 470 is positioned around the cylindrical member 412 of the nut 402 such that the cylindrical member 412 extends through the aperture 472 of the bushing 470.

Each of the arm portions 434, 436 is bent around one of the sidewalls 412 of the nut 402 and above the upper surface 408 of the nut 402. The free ends 442, 444 of the arm portions 434, 436 are typically spaced apart and are positioned within the slot 482 of the bushing 470 such that the semi-circular cutouts 438, 440 are in alignment with one another. A diameter of the semi-circular cutouts 438, 440 is slightly larger than the outer diameter of the bushing 470 at the slot 482, but is smaller than the outer diameters of the bushing 470 at the upper and lower flanges 478, 480 such that the bushing 470 cannot fall into the cage 404 through the semi-circular cutouts 438, 440. The slot 482 is sized for an interference fit with the arm portions 434, 436 such that the upper flange 478 is substantially in abutment with the lower surface 230 of the cage 404 at the arm portions 434, 436, and such that the lower flange 480 is substantially in abutment with the upper surface 428 of the cage 404 at the arm portion 434, 436. Thus, the bushing 470 is secured to the cage 404 with the cylindrical member 412 of the nut 402 extending through the aperture 472 of the bushing 470. The inner diameter of the bushing 470 must be larger than an outer diameter of the cylindrical member 412 of the nut 402.

Thus, the cage 404 effectively encages the nut 402 to form the cage nut assembly 400, which is best illustrated in FIGS. 19 and 20. The cage 404 is sized so that the nut 404 has a limited range of movement in at least one dimension, and preferably in two dimensions, for example the "X" and "Y" axes as illustrated in FIG. 19.

Once the cage nut assembly 400 is formed, a first portion (not shown) of a press (not shown) supports the lower surface 409 of the nut 402 off of the upper surface 428 of the base portion 432 of the cage 404, as the first portion of the press is capable of extending through the aperture 437 in the base portion 432 of the cage 404. A second portion (not shown) of the press then lowers onto the top end 424 of the cylindrical member 412 of the nut 402. The press then presses down onto the top end 424 of the cylindrical member 412 which results in the tearing of the cylindrical member 412 along the indents 420.

The tearing of the cylindrical member 412 along the indents 420 causes the nut 502 to collapse and provide a plurality of flanges 446. It should be noted that while the flanges 446 are preferably formed by indents 420 in the cylindrical member 412, the flanges 446 could also be preformed in the cylindrical member 412 such that they are connected by a webbing (not shown) or any other similar or equivalent construction, which would tear upon the press pressing down on the top end 424 of the cylindrical member 412. Alternatively, the flanges 446 could be preformed in the cylindrical member 412 such that they are separated by slits (not shown), which would allow for the flanges 446 to be bent down upon the press pressing down on the top end 424 of the cylindrical member 412.

Figure 21:
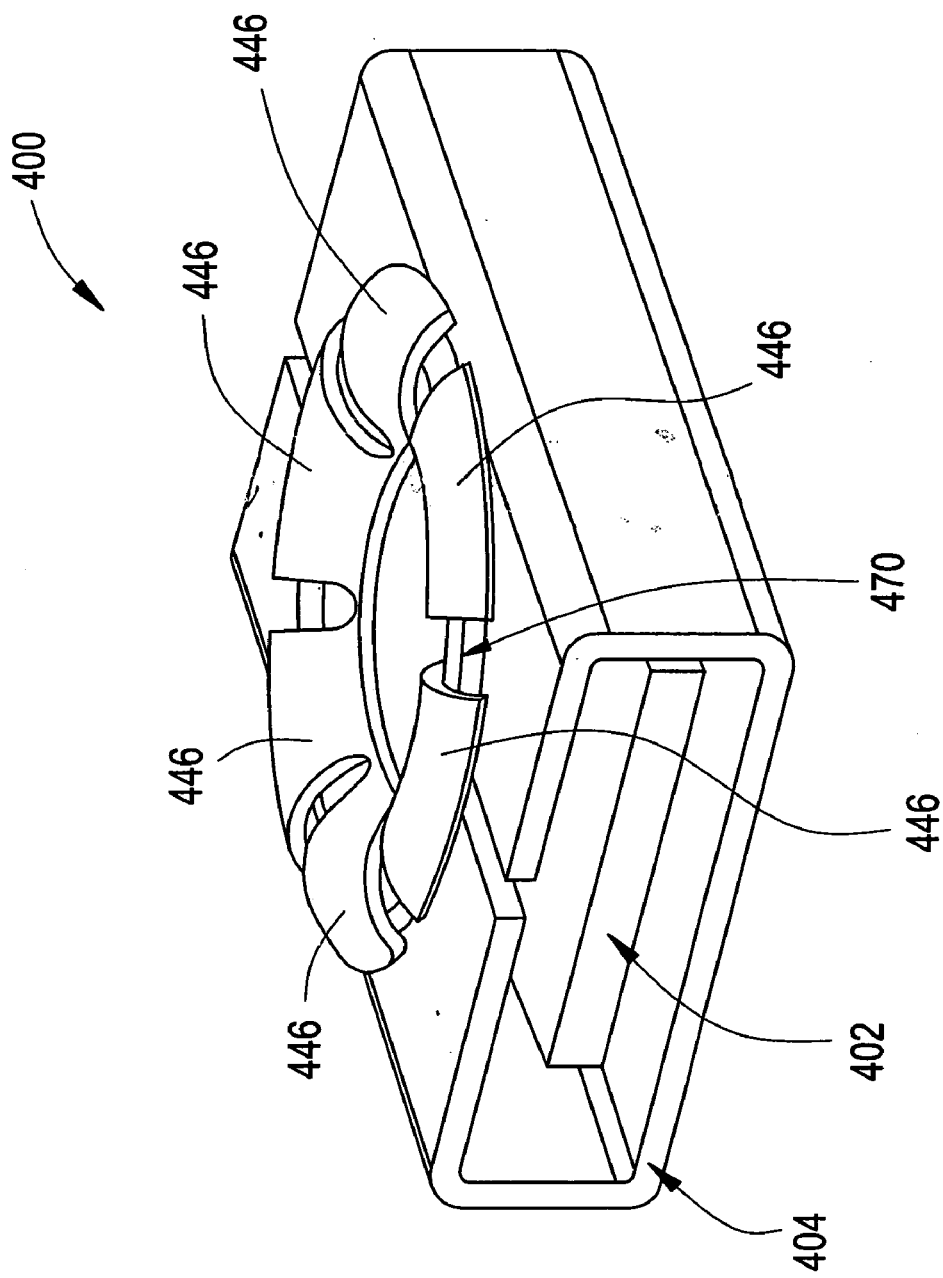
FIG. 21 is a perspective view of the cage nut assembly shown in FIG. 19, showing the flanges of the nut being curved/mushroomed down onto a bushing connected to a cage.
Figure 22:
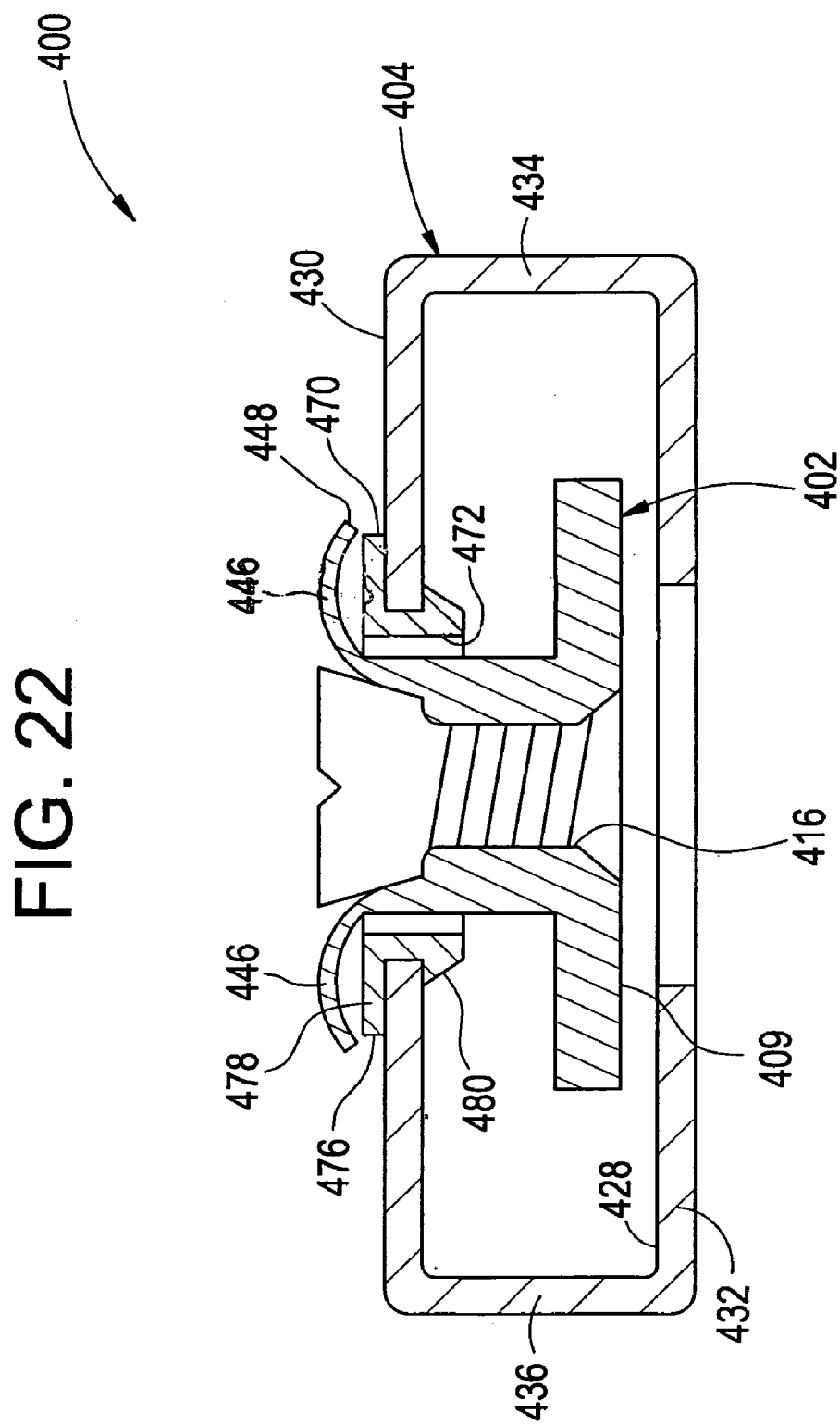
FIG. 22 is a cross-sectional view of the cage nut assembly shown in FIG. 21.

The flanges 446 are curved or mushroomed around the bushing 470 such that edges 448 of the flanges 446 do not contact the arm portions 434, 436 of the cage nut 404, as best illustrated in FIGS. 21 and 22. It should be noted that because the flanges 446 are curved/mushroomed around the bushing 470, instead of folded down onto the bushing 470, similar to the flanges 246 of the second embodiment described hereinabove, the upper flange 478 of the bushing 470 must provide for a larger outer diameter of the bushing 470 than does the upper flange 278 of the bushing 270 in order to ensure that the ends 448 of the flanges 446 do not contact the lower surface 430 of the cage nut 404 at the arm portions 434, 436.

A diameter of the flanges 446, measured from opposite edges 448 of the curved/mushroomed flanges 446 (the edges 448 were previously the top end 424 of the cylindrical member 412), is sized to be large enough to ensure that the nut 402 cannot fall through the aperture 472 of the bushing 470, e.g., the diameter of the flanges 446 being larger than the inner diameter of the bushing 470. Thus, the nut 402 is able to float in the "X" and "Y" axes and the lower surface 409 of the nut 402 does not contact the upper surface 428 of the base portion 432 of the cage 404.

The lower surface 430 of the base portion 432 of the cage 404 is then welded to a workpiece 450. The workpiece 450 has an aperture 452 provided therethrough and first and second surfaces 454, 456. The lower surface 430 of the base portion 432 of the cage 404 is welded to the first surface 454 of the workpiece 450 such that the aperture 452 of the workpiece 450 is in communication with the aperture 437 through the base portion 432 of the cage 404, and with the aperture 414 which extends through the nut 402.

The workpiece 450 and the cage 404 are then typically sent through an e-coat or ELPO bath that is meant to add a corrosion or paint coating to the first surface 454 of the workpiece 450. The curving/mushrooming of the flanges 446 keeps the lower surface 409 of the nut 402 from coming into contact with the upper surface 428 of the base portion 432 of the cage 404, thus reducing the possibility that the cage 404 and the nut 402 will stick or adhere to each other after coating or welding is complete.

Also, the bushing 470 acts as an electroplating inhibitor. With the bushing 470 in place, there is no metal to metal contact between the nut 402 and the cage 404 such that when electricity moves through the cage 404 to deposit paint thereon, the nut 402 will not receive an electrical current and, thus, will not have paint deposited thereon. If the nut 402 and the cage 404 are in contact with one another, the nut 402 may have some paint deposited thereon which could cause problems with the nut 402 if the aperture wall 416 is finely threaded, as the paint or like will cause torqueing issues in the fine threads of the aperture wall 416. If the aperture wall 416 of the nut 402 is not finely threaded, but rather is coarsely threaded, the deposit of paint or the like on the threads of the aperture wall 416 is not as big a concern with regard to torqueing issues.

The fastener 418, such as a bolt or screw, which has a head portion 460 and a threaded shank portion 462 extending therefrom, is then connected to the cage nut assembly 400 and the workpiece 450. The fastener 418 is connected by inserting the threaded shank portion 462 of the fastener 418 through the aperture 452 of the workpiece 450, through the aperture 437 of the base portion 432 of the cage 404 and into the aperture 414 of the nut 402, such that the threaded shank portion 462 of the fastener 418 is threadedly engaged with the threaded aperture wall 416 of the nut 402, until the head portion 460 of the fastener 418 abuts against the second surface 456 of the workpiece 450.

Figure 23:
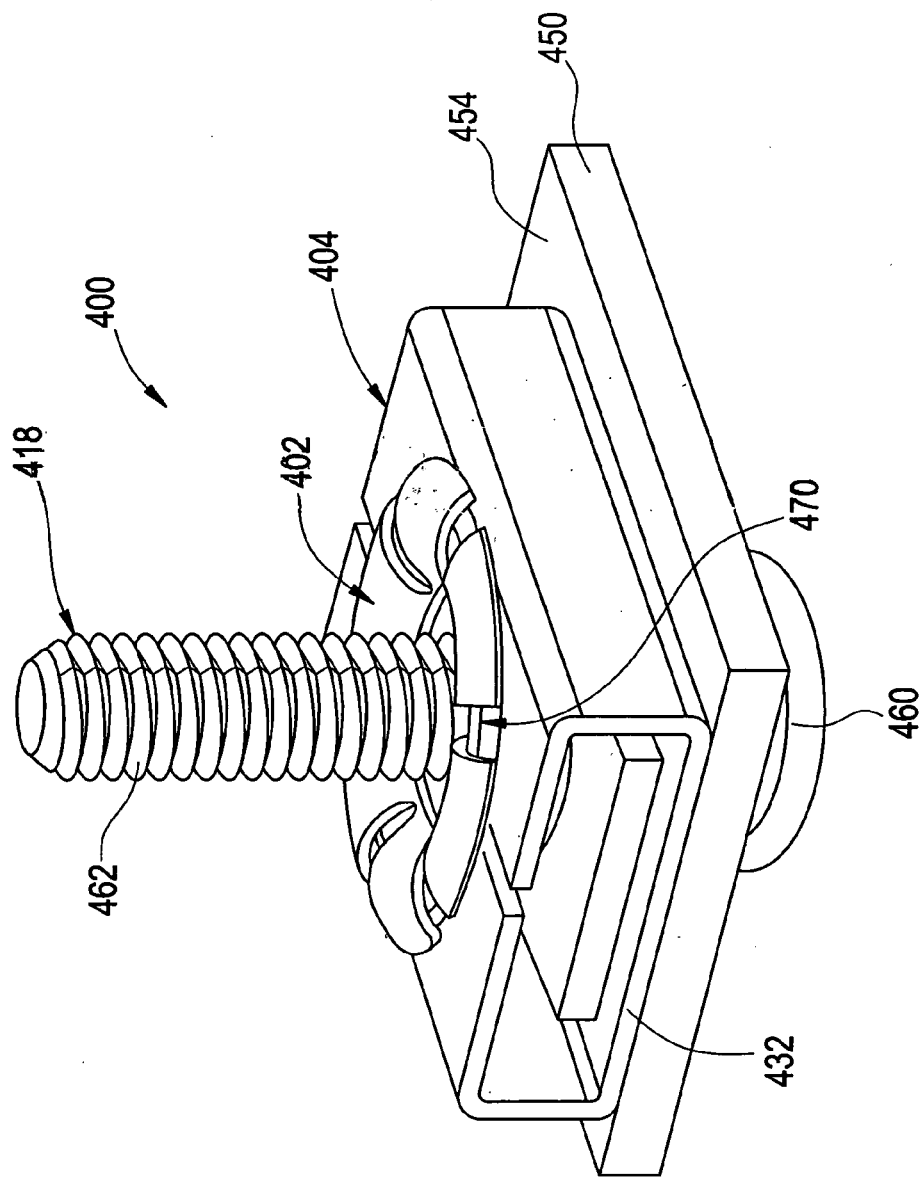
FIG. 23 is a perspective view of the cage nut assembly of FIGS. 19–22, showing the assembly being connected to a workpiece by a fastener.
Figure 24:
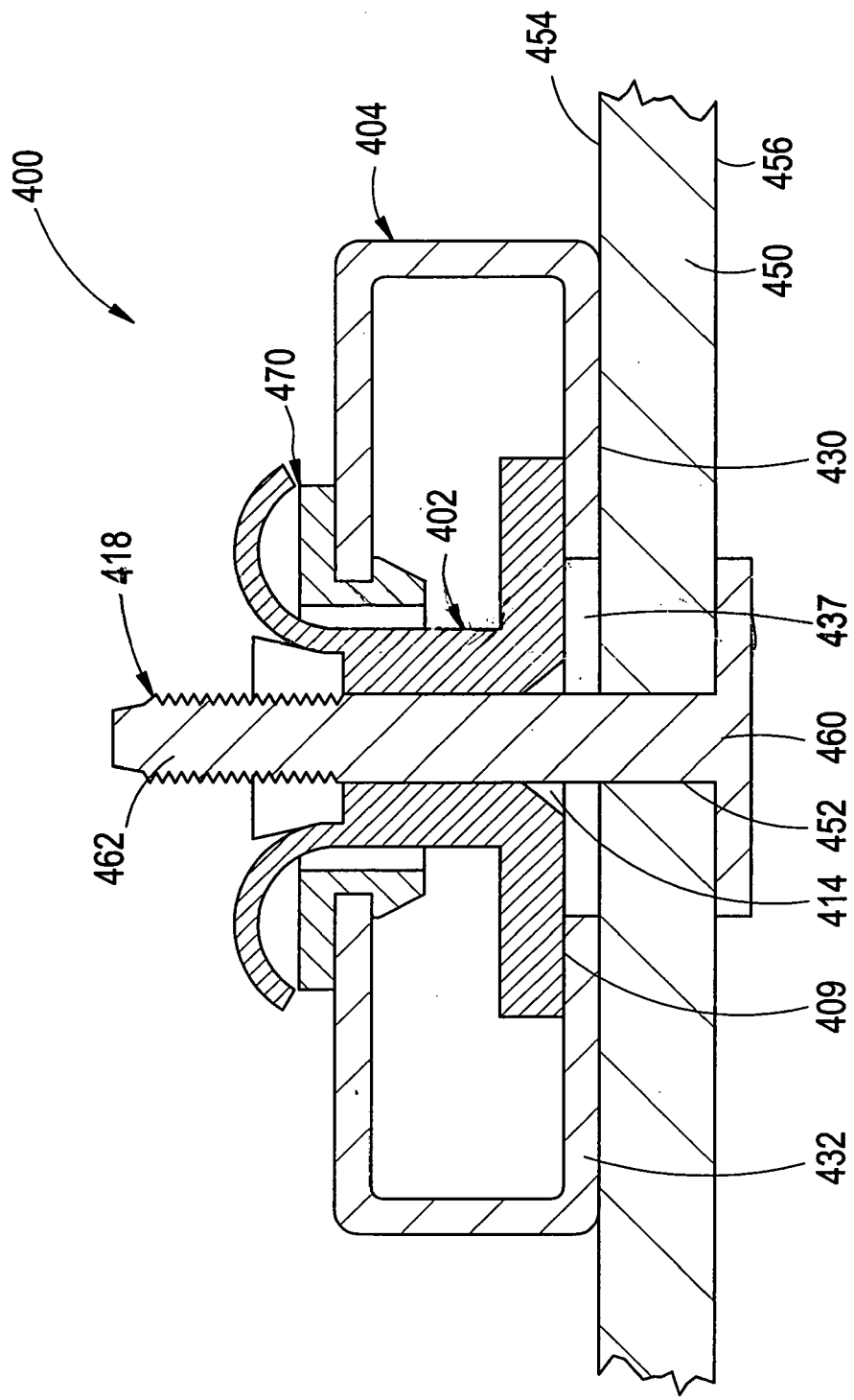
FIG. 24 is a cross-sectional view of the cage nut assembly shown in FIG. 23, showing the assembly being connected to a workpiece by a fastener.

As the fastener 418 is torqued into place, by threaded engagement with the aperture wall 416 of the nut 402, the rectangular plate 406 of the nut 402 is pulled down to interface with the upper surface 428 of the base portion 432 of the cage 404, thus providing a solid joint between the nut 402, the cage 404, the bushing 470, the workpiece 450 and the fastener 418. The rectangular plate 406 is able to be pulled down to interface with the upper surface 428 of the base portion 432 of the cage 404 because the flanges 446 are bent upward, as illustrated in FIGS. 23 and 24, as the fastener 418 is torqued into place.

Attention is directed to a cage nut assembly 500 which is in accordance with a fifth embodiment of the present invention, and which is best illustrated in FIGS. 25–28. The cage nut assembly 500 includes a nut 502 and a cage 504.

The nut 502 is identical to the nuts 102, 202, 302, 402 of the first, second, third and fourth embodiments and, thus, will not be described in detail herein again with the understanding that like reference numerals refer to like parts.

Figure 25:
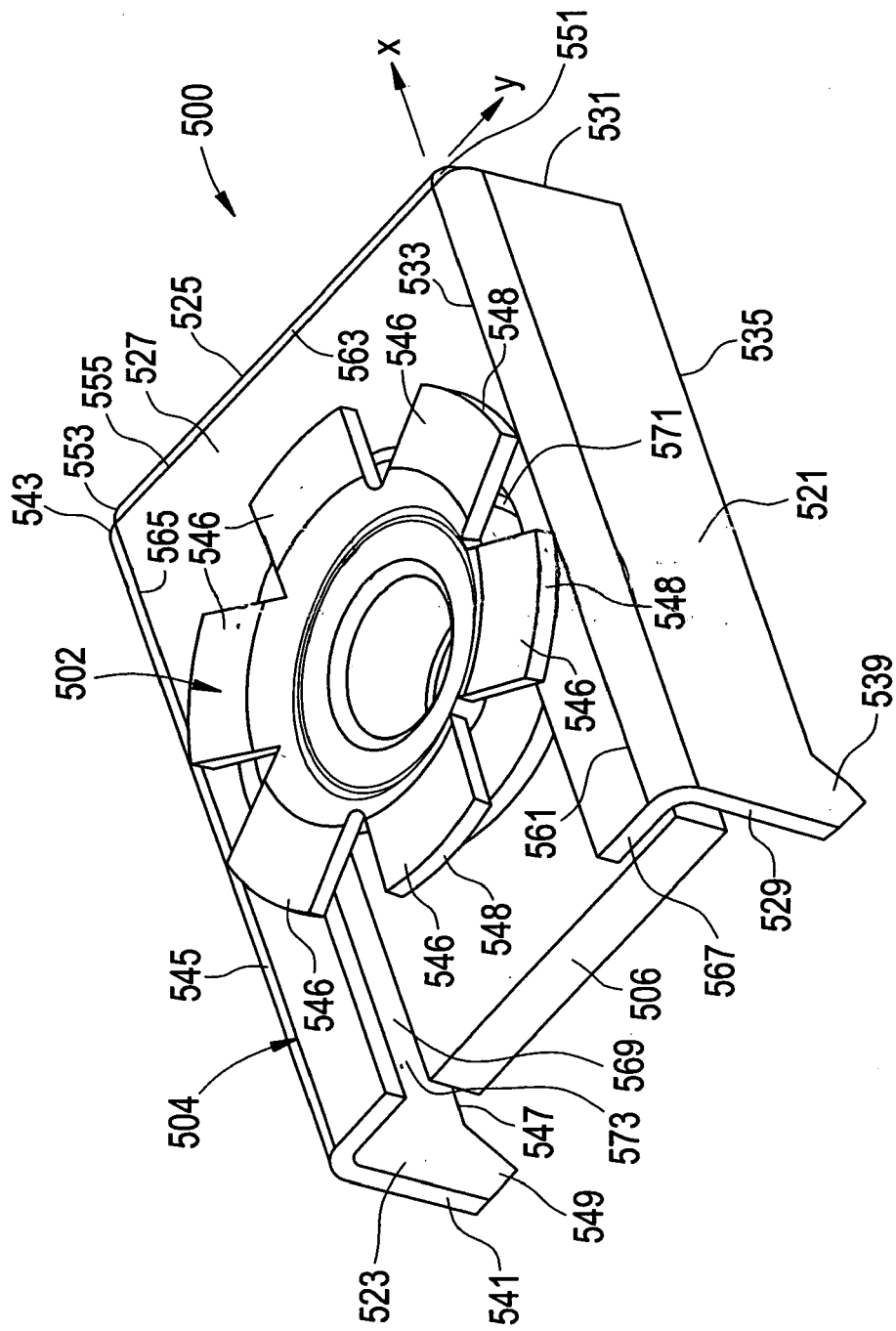
FIG. 25 is a perspective view of the cage nut assembly which is in accordance with a fifth embodiment of the invention, showing the flanges of the nut being folded down onto a cage.
Figure 26:
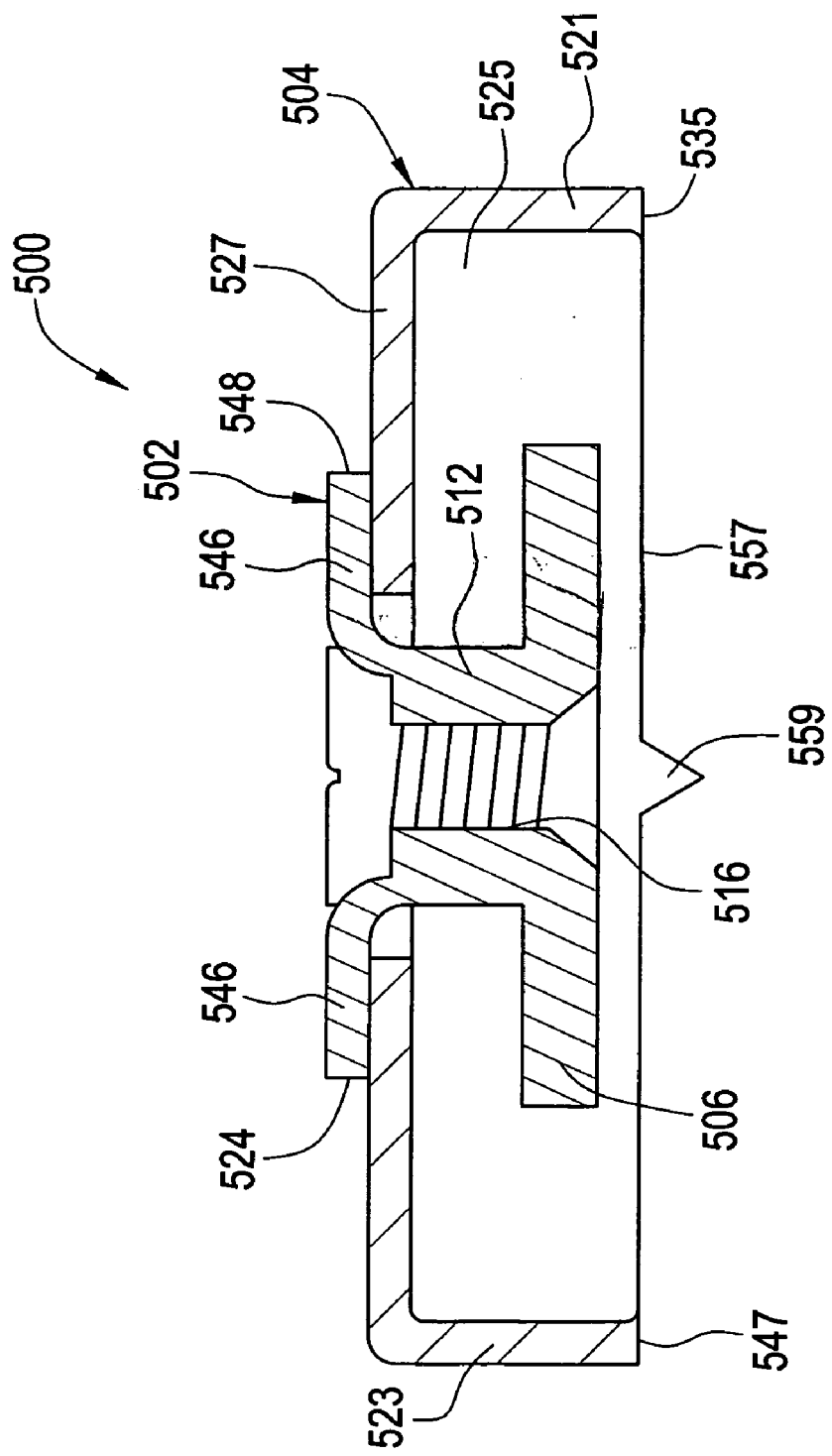
FIG. 26 is a cross-sectional view of the cage nut assembly shown in FIG. 25.

The cage 504 is used for encaging the nut 502. Prior to encaging the nut 502, the cage 504 is formed to have a first side wall 521, a second side wall 523, a rear wall 525 and a top wall 527, all of which are integrally formed, as best illustrated in FIGS. 25 and 26.

The first side wall 521 extends along the "X" axis and has a first side edge 529, a second side edge 531, a top edge 533 and a bottom edge 535. Proximate to the first side edge 529, a tab 539 extends downwardly from the bottom edge 535, away from the top edge 533.

The second side wall 523 extends along the "X" axis and is parallel to the first side wall 521. The second side wall 523 has a first side edge 541, a second side edge 543, a top edge 545 and a bottom edge 547. Proximate to the first side edge 541, a tab 549 extends downwardly from the bottom edge 547, away from the top edge 545.

The rear wall 525 extends along the "Y" axis between the first and second side walls 521, 523, proximate to the second side edges 531, 543 thereof, respectively. The rear wall 525 has a first side edge 551, a second side edge 553, a top edge 555 and a bottom edge 557. The first side edge 551 is positioned proximate to the second side edge 531 of the first side wall 521 and the second side edge 553 is positioned proximate to the second side edge 543 of the second side wall 523. Equidistant from the first side edge 551 and the second side edge 553, a tab 559 extends downwardly from the bottom edge 557, away from the top edge 555.

The top wall 527 has a first edge 561, a second edge 563, a third edge 565 and a fourth edge 567. The top wall 527 connects the first and second side walls 521, 523 and the rear wall 525 together. The first edge 561 of the top wall 527 being connected to the top edge 533 of the first side wall 521, the second edge 563 of the top wall 527 being connected to the top edge 555 of the rear wall 525, and the third edge 565 of the top wall 527 being connected to the top edge 545 of the second side wall 523. The top wall 527 includes a cavity 569 which has its opening at the fourth edge 567 of the top wall 527, and which extends toward the second edge 563 of the top wall 527, but does not extend to the second edge 563 of the top wall 527. A base portion 571 of the cavity 569, which is proximate to the second edge 563 of the top wall 527, is generally circular whereas a top portion 573 of the cavity 569, which is provided proximate to the fourth edge 567 of the top wall 527, is generally rectangular.

In operation, and as best illustrated in FIGS. 25–28, the nut 502 is positioned within the cage 504 by moving the cylindrical member 512 into the cavity 569 and positioning the cylindrical member 512 into the base portion 571 of the cavity 569. A first portion (not shown) of a press (not shown) supports the lower surface (not shown) of the nut 502 as the first portion of the press is capable of extending into the cage 504 as the cage 504 has no bottom wall. A second portion (not shown) of the press then lowers onto the top end 524 of the cylindrical member 512 of the nut 502. The press then presses down onto the top end 524 of the cylindrical member 512 which results in the tearing of the cylindrical member 512 along the indents (not shown).

The tearing of the cylindrical member 512 along the indents 520 causes the nut 502 to collapse and provide a plurality of flanges 546. It should be noted that while the flanges 546 are preferably formed by indents 520 in the cylindrical member 512, the flanges 546 could also be preformed in the cylindrical member 512 such that they are connected by a webbing (not shown) or any other similar or equivalent construction, which would tear upon the press pressing down on the top end 524 of the cylindrical member 512. Alternatively, the flanges 546 could be preformed in the cylindrical member 512 such that they are separated by slits (not shown), which would allow for the flanges 546 to be bent down upon the press pressing down on the top end 524 of the cylindrical member 512.

The flanges 546 are folded down onto the top wall 527 of the cage 504 and are bent at an angle so as to preferably allow only minimal contact with the top wall 527 of the cage 504, as best illustrated in FIGS. 25 and 26. A diameter of the flanges 546, measured from opposite edges 548 of the folded flanges 546 (the edges 548 of the flanges 546 were previously the top end 524 of the cylindrical member 512), is sized to be large enough to ensure that the nut 502 cannot fall through the cavity 569 of the cage 504, e.g., the diameter of the flanges 546 being larger than a diameter of the base portion 571 of the cavity 569. Thus, the nut 502 is able to float in the "X" and "Y" axes. The cage 504 is sized so that the plate 506 of the nut 502 does not extend beyond the bottom edges 535, 547, 557 of the first and second side walls 521, 523 and the rear wall 525.

The tabs 539, 549, 559 of the cage 504 are then welded to a workpiece 550. The workpiece 550 has an aperture 552 provided therethrough and first and second surfaces 554, 556. The tabs 539, 549, 559 of the cage 504 are welded to the first surface 554 of the workpiece 550 such that the aperture 552 of the workpiece 550 is in communication with the aperture 514 which extends through the nut 502. The workpiece 550 and the cage 504 are then typically sent through an e-coat or ELPO bath that is meant to add a corrosion or paint coating to the first surface 554 of the workpiece 550. The folding over of the flanges 546 keeps the lower surface 509 of the nut 502, which is positioned above the bottom edges 535, 547, 557 of the cage 504, from coming into contact with the first surface 554 of the workpiece 550, thus reducing the possibility that the workpiece 550 and the nut 502 will stick or adhere to each other after coating or welding is complete.

The fastener 518, such as a bolt or screw, which has a head portion 560 and a threaded shank portion 562 extending therefrom, is then connected to the cage nut assembly 500 and the workpiece 550. The fastener 518 is connected by inserting the threaded shank portion 562 of the fastener 518 through the aperture 552 of the workpiece 550 and into the aperture 514 of the nut 502, such that the threaded shank portion 562 of the fastener 518 is threadedly engaged with the threaded aperture wall 516 of the nut 502, until the head portion 560 of the fastener 518 abuts against the second surface 556 of the workpiece 550.

Figure 27:
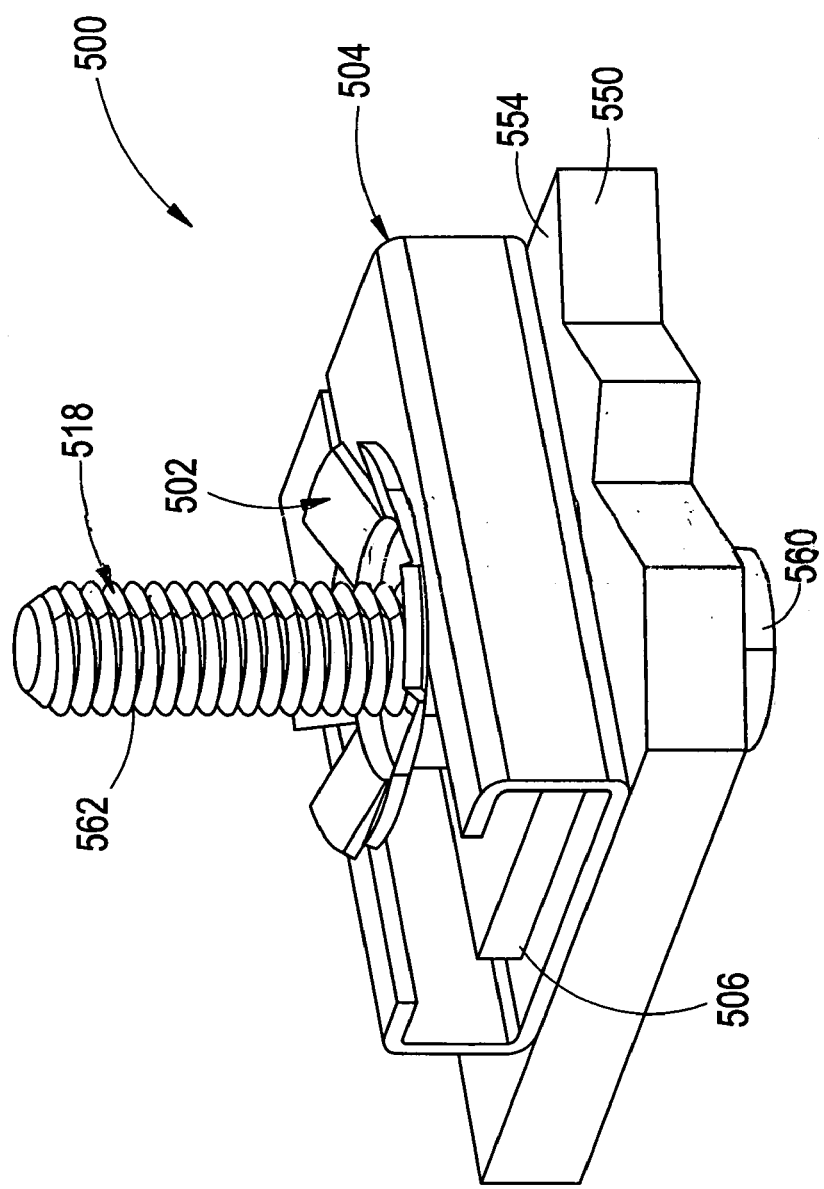
FIG. 27 is a perspective view of the cage nut assembly of FIGS. 25–26, showing the assembly being connected to a workpiece by a fastener.
Figure 28:
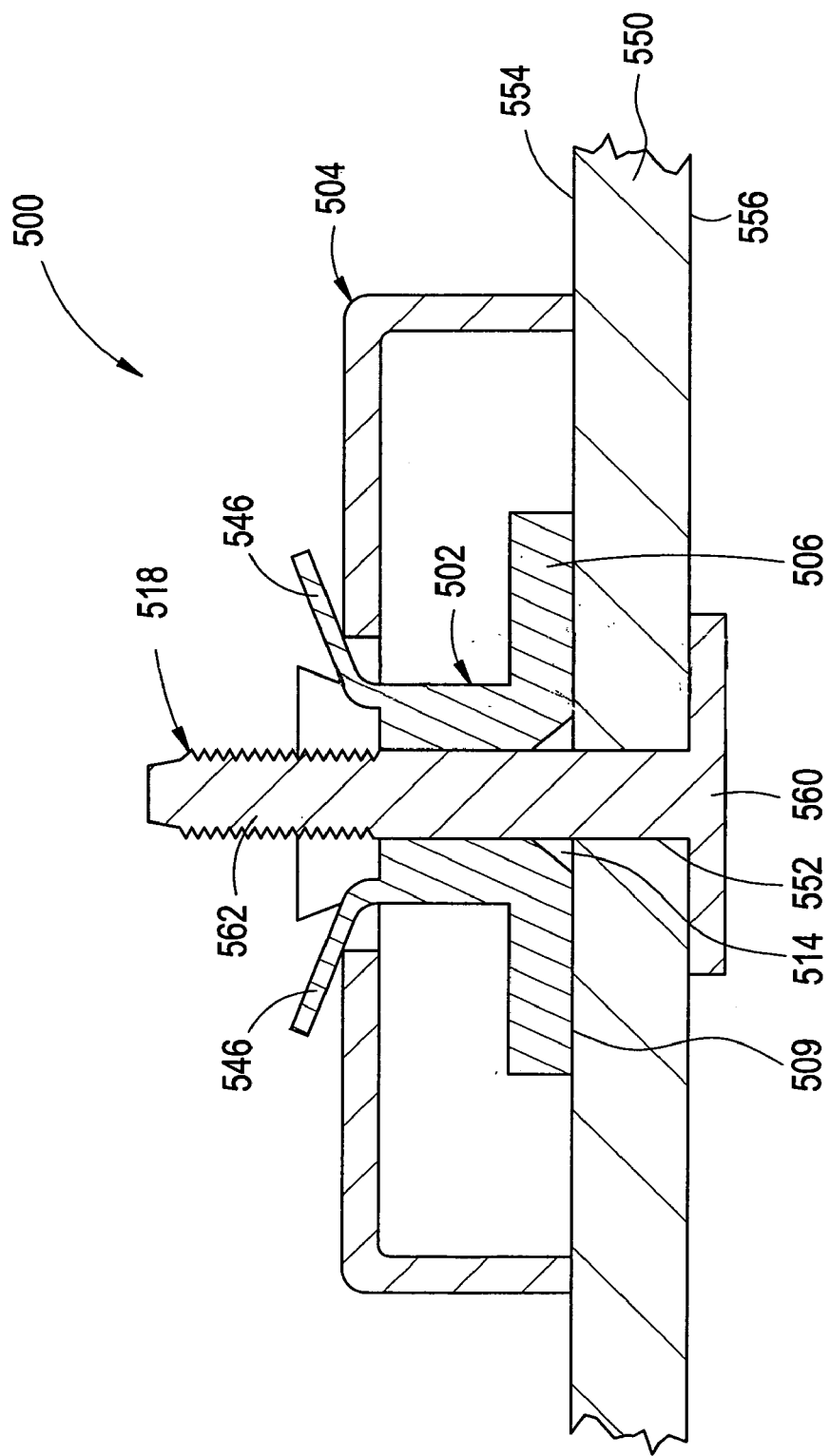
FIG. 28 is a cross-sectional view of the cage nut assembly shown in FIG. 27, showing the assembly being connected to a workpiece by a fastener.

As the fastener 518 is torqued into place, by threaded engagement with the aperture wall 516 of the nut 502, the rectangular plate 506 of the nut 502 is pulled down to interface the first surface 554 of the workpiece 550, thus providing a solid joint between the nut 502, the cage 504, the workpiece 550 and the fastener 518. The rectangular plate 506 is able to be pulled down to interface the first surface 554 of the workpiece 550 because the flanges 546 are bent upward, as illustrated in FIGS. 27 and 28, as the fastener 518 is torqued into place.

Thus, the cage nut assemblies 100, 300, 500 are preferably used when the nut 100, 300, 500 of the cage nut assemblies 100, 300, 500 has an aperture wall 116, 316, 516 which is not finely threaded, but rather is coarsely threaded, as costs are saved when the bushing 170, 370, 570 is not included in the cage nut assembly 100, 300, 500. Conversely, the cage nut assemblies 200, 400 are preferably used when the nut 200, 400 of the cage nut assemblies 200, 400 has an aperture wall 216, 416 which is finely threaded. Of course, the cage nut assemblies 100, 300, 500 can also be used when the aperture wall 116, 316, 516 is finely threaded and the cage nut assemblies 200, 400 can also be used when the aperture wall 216, 416 is not finely threaded, but rather is coarsely threaded.

It should be noted that, if desired, the cage nut assembly 500 could be configured to have a bushing, similar to the cage nut assembly 200 of the second embodiment described hereinabove. It should further be noted that, if desired, the cage nut assembly 500 could be configured by curving/mushrooming the flanges 546, similar to the cage nut assembly 300 of the third embodiment described hereinabove. It should further be noted that, if desired, the cage nut assembly 500 could be configured by curving/mushrooming the flanges 546 and to have a bushing, similar to the cage nut assembly 400 of the fourth embodiment described hereinabove.

While preferred embodiments of the present invention are shown and described, it is envisioned that those skilled in the art may devise various modifications of the present invention without departing from the spirit and scope of the appended claims.

The invention claimed is:

1. An assembly comprising:
a one-piece nut member having a base portion with an upper surface and a generally cylindrical portion extending directly from said upper surface of said nut member base portion, said one-piece nut member having an aperture extending through said nut member base portion and said generally cylindrical extending portion, said generally cylindrical extending portion being configured to outwardly collapse upon a force being applied thereto; and
means for encaging said nut member, said encaging means providing a limited range of movement of said one-piece nut member in at least one dimension, said encaging means having means for allowing access to said aperture of said one-piece nut member within the limited range of movement of said one-piece nut member provided by said encaging means, said encaging means includes an encaging means base portion and a pair of arm portions extending from opposite ends of said encaging means base portion and having free ends, at least one of said arm portions defining a cutout at said free end thereof, said arm portions being bent such that said free ends of said arm portions face one another and are in alignment with one another, said generally cylindrical extending portion of said one-piece nut member extends through said cutout of said at least one arm portion and wherein said nut member base portion is positioned between said encaging means base portion and said arm portions.

2. The assembly as defined in claim 1, wherein said one-piece nut member further has means for allowing said generally cylindrical extending portion to be collapsed upon a force being applied thereto.

3. The assembly as defined in claim 2, wherein said allowing means includes a plurality of indents provided on said generally cylindrical extending portion of said one-piece nut member.

4. The assembly as defined in claim 1, wherein said generally cylindrical extending portion comprises a plurality of flanges, said flanges being positioned against said encaging means after being collapsed such that said nut member base portion is supported off of said encaging means.

5. The assembly as defined in claim 1, wherein said generally cylindrical extending portion includes a threaded wall, said threaded wall defining at least a portion of said aperture.

6. The assembly as defined in claim 1, wherein a bushing is connected to said arm portions and is positioned within said cutout of said at least one arm portion, said bushing having an aperture therethrough.

7. The assembly as defined in claim 6, wherein said generally cylindrical extending portion of said one-piece nut member extends through said aperture of said bushing.

8. The assembly as defined in claim 7, wherein said bushing is formed of an electrically non-conductive material.

9. The assembly as defined in claim 1, wherein said allowing means is an aperture provided through said encaging means base portion.

10. An assembly comprising:
a one-piece nut member having a base portion with an upper surface and a generally cylindrical portion extending directly from said upper surface of said nut member base portion, said one-piece nut member having an aperture extending through said nut member base portion and said generally cylindrical extending portion, said generally cylindrical extending portion being configured to outwardly collapse upon a force being applied thereto;
means for encaging said nut member, said encaging means providing a limited range of movement of said one-piece nut member in at least one dimension, said encaging means having means for allowing access to said aperture of said one-piece nut member within the limited range of movement of said one-piece nut member provided by said encaging means; and
an electro-plating inhibitor positioned between said generally cylindrical nut member and said encaging means.

11. The assembly as defined in claim 10, wherein said encaging means includes an encaging means base portion and a pair of arm portions extending from opposite ends of said encaging means base portion and having free ends, at least one of said arm portions defining a cutout at said free end thereof, said arm portions being bent such that said free ends of said arm portions face one another and are in alignment with one another.

12. The assembly as defined in claim 10, wherein said electro-plating inhibitor is a bushing formed of an electrically non-conductive material.

13. The assembly as defined in claim 10, wherein said generally cylindrical extending portion comprises a plurality of flanges, said flanges being positioned against said encaging means after being collapsed such that said nut member base portion is supported off of said encaging means.

14. The assembly as defined in claim 10, wherein said generally cylindrical extending portion includes a threaded wall, said threaded wall defining at least a portion of said aperture.

15. The assembly as defined in claim 10, wherein said allowing means is an aperture provided through said encaging means.

16. A combination comprising:
a workpiece having first and second surfaces and an aperture provided therethrough;
a nut member having a base portion and a portion extending therefrom, said nut member having an aperture extending through said base portion and said extending portion, said extending portion includes a threaded wall, said threaded wall defining at least a portion of said aperture, said extending portion of said nut member being at least partially formed of a plurality of flanges;
a cage member which is associated with said first surface of said workpiece, said cage member having an opening therethrough, said base portion of said nut member being encaged within said cage member, said plurality of flanges extending through said opening of said cage member and being in contact with said cage member; and
a fastener having an enlarged head portion and an elongated threaded shank extending therefrom, said enlarged head portion being associated with said second surface of said workpiece, said elongated shank extending through said aperture of said workpiece and being in threaded engagement with said threaded wall of said nut member.

17. The combination as defined in claim 16, wherein said cage member is welded to said first surface of said workpiece.

18. The combination as defined in claim 16, wherein said enlarged head portion is positioned against said second surface of said workpiece.

19. The combination as defined in claim 16, wherein said base portion of said nut member is positioned against said cage member.

20. The combination as defined in claim 16, wherein said base portion of said nut member is positioned against said first surface of said workpiece.

21. The combination as defined in claim 16, wherein said plurality of flanges are folded down to have only minimal contact with said cage member.

22. The combination as defined in claim 16, wherein said plurality of flanges are curved down to have only minimal contact with said cage member.

23. The combination as defined in claim 16, wherein said plurality of flanges are mushroomed down to have only minimal contact with said cage member.

24. The assembly as defined in claim 10, wherein said one-piece nut member further has means for allowing said generally cylindrical extending portion to be collapsed upon a force being applied thereto.

25. The assembly as defined in claim 24, wherein said allowing means includes a plurality of indents provided on said generally cylindrical extending portion of said one-piece nut member.

26. A combination comprising:
a workpiece having first and second surfaces and an aperture provided therethrough;
a nut member having a base portion and a portion extending therefrom, said nut member having an aperture extending through said base portion and said extending portion, said extending portion includes a threaded wall, said threaded wall defining at least a portion of said aperture, said extending portion of said nut member being at least partially formed of a plurality of flanges;
a cage member which is associated with said first surface of said workpiece, said cage member having an opening therethrough, said base portion of said nut member being encaged within said cage member;
a bushing associated with said cage member and being positioned within said opening of said cage member, said bushing having an aperture therethrough, said plurality of flanges extending through said aperture of said bushing and being in contact with said bushing; and
a fastener having an enlarged head portion and an elongated threaded shank extending therefrom, said enlarged head portion being associated with said second surface of said workpiece, said elongated shank extending through said aperture of said workpiece and being in threaded engagement with said threaded wall of said nut member.

27. The combination as defined in claim 26, wherein said cage member is welded to said first surface of said workpiece.

28. The combination as defined in claim 26, wherein said enlarged head portion is positioned against said second surface of said workpiece.

29. The combination as defined in claim 26, wherein said base portion of said nut member is positioned against said cage member.

30. The combination as defined in claim 26, wherein said base portion of said nut member is positioned against said first surface of said workpiece.

31. The combination as defined in claim 26, wherein said plurality of flanges are folded down to be in contact with said bushing.

32. The combination as defined in claim 26, wherein said plurality of flanges are curved down to be in contact with said bushing.

33. The combination as defined in claim 26, wherein said bushing is formed of an electrically non-conductive material.

34. The combination as defined in claim 26, wherein said plurality of flanges are mushroomed down to be in contact with said bushing.

35. An assembly comprising:
a nut member having a nut member base portion and a portion extending therefrom, said nut member having an aperture extending through said nut member base portion and said extending portion, said extending portion being configured to collapse upon a force being applied thereto; and
means for encaging said nut member, said encaging means providing a limited range of movement of said nut member in at least one dimension, said encaging means having means for allowing access to said aperture of said nut member within the limited range of movement of said nut member provided by said encaging means, said encaging means includes an encaging means base portion and a pair of arm portions extending from opposite ends of said encaging means base portion and having free ends, at least one of said arm portions defining a cutout at said free end thereof, said arm portions being bent such that said free ends of said arm portions face one another and are in alignment with one another, said extending portion of said nut member extends through said cutout of said at least one arm portion and wherein said nut member base portion is positioned between said encaging means base portion and said arm portions.

36. The assembly as defined in claim 35, wherein a bushing is connected to said arm portions and is positioned within said cutout of said at least one arm portion, said bushing having an aperture therethrough.

37. The assembly as defined in claim 36, wherein said extending portion of said nut member extends through said aperture of said bushing.

38. The assembly as defined in claim 37, wherein said bushing is formed of an electrically non-conductive material.

39. The assembly comprising:
   a nut member having a base portion and a portion extending therefrom, said nut member having an aperture extending through said base portion and said extending portion, said extending portion being configured to collapse upon a force being applied thereto;
   means for encaging said nut member, said encaging means providing a limited range of movement of said nut member in at least one dimension, said encaging means having means for allowing access to said aperture of said nut member within the limited range of movement of said nut member provided by said encaging means; and
   an electro-plating inhibitor positioned between said nut member and said encaging means, said electro-plating inhibitor is a bushing formed of an electrically non-conductive material.

40. An assembly comprising:
   a nut member having a nut member base portion and a portion extending therefrom, said nut member having an aperture extending through said nut member base portion and said extending portion, said extending portion being configured to collapse upon a force being applied thereto; and
   means for encaging said nut member, said encaging means providing a limited range of movement of said nut member in at least one dimension, said encaging means having means for allowing access to said aperture of said nut member within the limited range of movement of said nut member provided by said encaging means, said encaging means includes an encaging means base portion and a pair of arm portions extending from opposite ends of said encaging means base portion and having semi-circular cutouts provided at free ends of said arm portions, said arm portions being bent such that said free ends of said arm portions face one another and are in alignment with one another, said extending portion of said nut member extends through said semicircular cutouts of said arm portions and wherein said nut member base portion is positioned between said encaging means base portion and said arm portions.

41. The assembly as defined in claim 40, wherein a bushing is connected to said arm portions and is positioned within said semicircular cutouts, said bushing having an aperture therethrough.

42. The assembly as defined in claim 41, wherein said extending portion of said nut member extends through said aperture of said bushing.

43. The assembly as defined in claim 42, wherein said bushing is formed of an electrically non-conductive material.

44. The assembly as defined in claim 40, wherein said allowing means is an aperture provided through said encaging means base portion.

* * * * *